(12) United States Patent
Shinohara

(10) Patent No.: US 12,745,010 B2
(45) Date of Patent: Sep. 22, 2026

(54) IMAGING DEVICE

(71) Applicant: NICHIA CORPORATION, Anan (JP)

(72) Inventor: Yoshinori Shinohara, Chino (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 18/982,373

(22) Filed: Dec. 16, 2024

(65) Prior Publication Data

US 2025/0211864 A1 Jun. 26, 2025

(30) Foreign Application Priority Data

Dec. 22, 2023 (JP) ................................ 2023-216735

(51) Int. Cl.

| | |
|---|---|
| ***H04N 23/74*** | (2023.01) |
| ***G01S 17/08*** | (2006.01) |
| ***G02B 7/02*** | (2021.01) |
| ***H04N 23/55*** | (2023.01) |
| ***H04N 23/56*** | (2023.01) |
| ***H04N 23/71*** | (2023.01) |

(52) U.S. Cl.

CPC ............... *H04N 23/74* (2023.01); *G02B 7/02* (2013.01); *H04N 23/55* (2023.01); *H04N 23/56* (2023.01); *H04N 23/71* (2023.01); *G01S 17/08* (2013.01)

(58) Field of Classification Search

CPC ........ H04N 23/74; H04N 23/55; H04N 23/56; H04N 23/71; G02B 7/02; G01S 17/08

See application file for complete search history.

(56) References Cited

U.S. PATENT DOCUMENTS

2019/0141255 A1* 5/2019 Hamano ................ H04N 23/56
2021/0243873 A1* 8/2021 Ishida .................... H04N 23/56
2024/0302718 A1* 9/2024 Fernández Dorado ...................... G06K 7/10752
2024/0339573 A1 10/2024 Yoshida

FOREIGN PATENT DOCUMENTS

| | | |
|---|---|---|
| JP | 2001-094728 A | 4/2001 |
| JP | 2006-227380 A | 8/2006 |
| JP | 2007-171518 A | 7/2007 |
| JP | 2010-197429 A | 9/2010 |
| JP | 2011-069893 A | 4/2011 |
| WO | WO-2023/120172 A1 | 6/2023 |

* cited by examiner

*Primary Examiner* — Nasim N Nirjhar
(74) *Attorney, Agent, or Firm* — Foley & Lardner LLP

(57) ABSTRACT

An imaging device includes imaging element; a light-emitting device spaced apart from the imaging element in a top view and including a plurality of light-emitting parts; a lens disposed above the light-emitting device; and a controller configured to control light emission of the plurality of light-emitting parts so as to control irradiation light from the light-emitting device onto an irradiation surface that is perpendicular to a central axis of the imaging element and includes a central point of an imaging region. The controller is configured to select, as a reference light-emitting part serving as a reference for controlling the irradiation light, a light-emitting part configured to irradiate the central point of the imaging region with light. The light-emitting device is configured to irradiate the irradiation surface with the irradiation light with the reference light-emitting part as a reference.

11 Claims, 17 Drawing Sheets

DISTANCE DETECTOR
CONTROLLER
7
4
6
5
1C
1
20
100
3
2
X
Y
Z

DISTANCE DETECTOR
CONTROLLER
7
4
200
Ls
6
5
1
1C
A
AC
3
LC
e
20
20s
θ
2C,3C
100
2
h
L
d
X
Z
Y

DISTANCE DETECTOR
CONTROLLER
7
4
6
5
1
3
2
100
200
300
11C,11
11-1
11-2
11-3
11-4
11-5
11-6
11-7
11C-1
11C-2
11C-3
11C-4
11C-5
11C-6
11C-7
D1
D2
D3
D4
D5
D6
D7
20C
20C-1
20C-2
20C-3
20C-4
20C-5
20C-6
20C-7
Ds
X
Y
Z

DISTANCE DETECTOR
CONTROLLER
7
4
6
5
1C
1
8
20
100a
3
2
X
Y
Z

DISTANCE DETECTOR
7
CONTROLLER
4
200
Ls
LC2
6
5
1
1C
A
δ
AC
11sC
e
8
3
20
3C
θ
α
2C
20s
LC1
2
100a
h
L
d
X
Z
Y

DISTANCE DETECTOR
CONTROLLER
7
4
200
6
Lt
5
1C
A
AC
1
e
8
δ
3
261
20
θ
3C
α
2C
261c
2
100b
h
X
Z
Y
L
d

IMAGING DEVICE

CROSS-REFERENCE TO RELATED APPLICATIONS

The present application claims priority under 35 U.S.C. § 119 to Japanese Patent Application No. 2023-216735, filed Dec. 22, 2023, the entire contents of which are hereby incorporated by reference.

BACKGROUND

1. Technical Field

The present disclosure relates to an imaging device.

2. Description of Related Art

For example, an imaging device including a light-emitting part that emits independently-controlled light beams to a plurality of irradiation regions, a distance measurement part that measures a distance for each of a plurality of distance-measurement regions set within an imaging angle of view, and a controller that causes the light-emitting part to emit light to the plurality of irradiation regions in accordance with measured distance results obtained by the distance measurement part (see Japanese Patent Publication No. 2006-227380, for example).

SUMMARY

According to an embodiment of the present disclosure, an imaging device that can reduce a deviation of irradiation light in a captured image can be provided.

An imaging device according to one embodiment of the present disclosure includes imaging element; a light-emitting device spaced apart from the imaging element in a top view and including a plurality of light-emitting parts; a lens disposed above the light-emitting device; and a controller configured to control light emission of the plurality of light-emitting parts so as to control irradiation light from the light-emitting device onto an irradiation surface that is perpendicular to a central axis of the imaging element and includes a central point of an imaging region. The controller is configured to select, as a reference light-emitting part serving as a reference for controlling the irradiation light, a light-emitting part configured to irradiate the central point of the imaging region with light. The light-emitting device is configured to irradiate the irradiation surface with the irradiation light with the reference light-emitting part as a reference.

An imaging device according to one embodiment of the present disclosure includes an imaging element; a light-emitting device spaced apart from the imaging element in a top view and including a plurality of light-emitting parts; a lens disposed above the light-emitting device; an actuator configured to move the lens; and a controller configured to control light emission of the plurality of light-emitting parts so as to control irradiation light from the light-emitting device onto an irradiation surface that is perpendicular to a central axis of the imaging element and includes a central point of an imaging region. The controller is configured to detect a positional deviation between light emitted from a center of a light-emitting surface of the light-emitting device and the central point of the imaging region on the irradiation surface. The actuator is configured to move, based on information detected by the controller, the lens such that the light emitted from the center of the light-emitting surface of the light-emitting device and the central point of the imaging region coincide with each other on the irradiation surface.

BRIEF DESCRIPTION OF THE DRAWINGS

A more complete appreciation of embodiments of the invention and many of the attendant advantages thereof will be readily obtained by reference to the following detailed description when considered in connection with the accompanying drawings.

DETAILED DESCRIPTION

Figure 1:
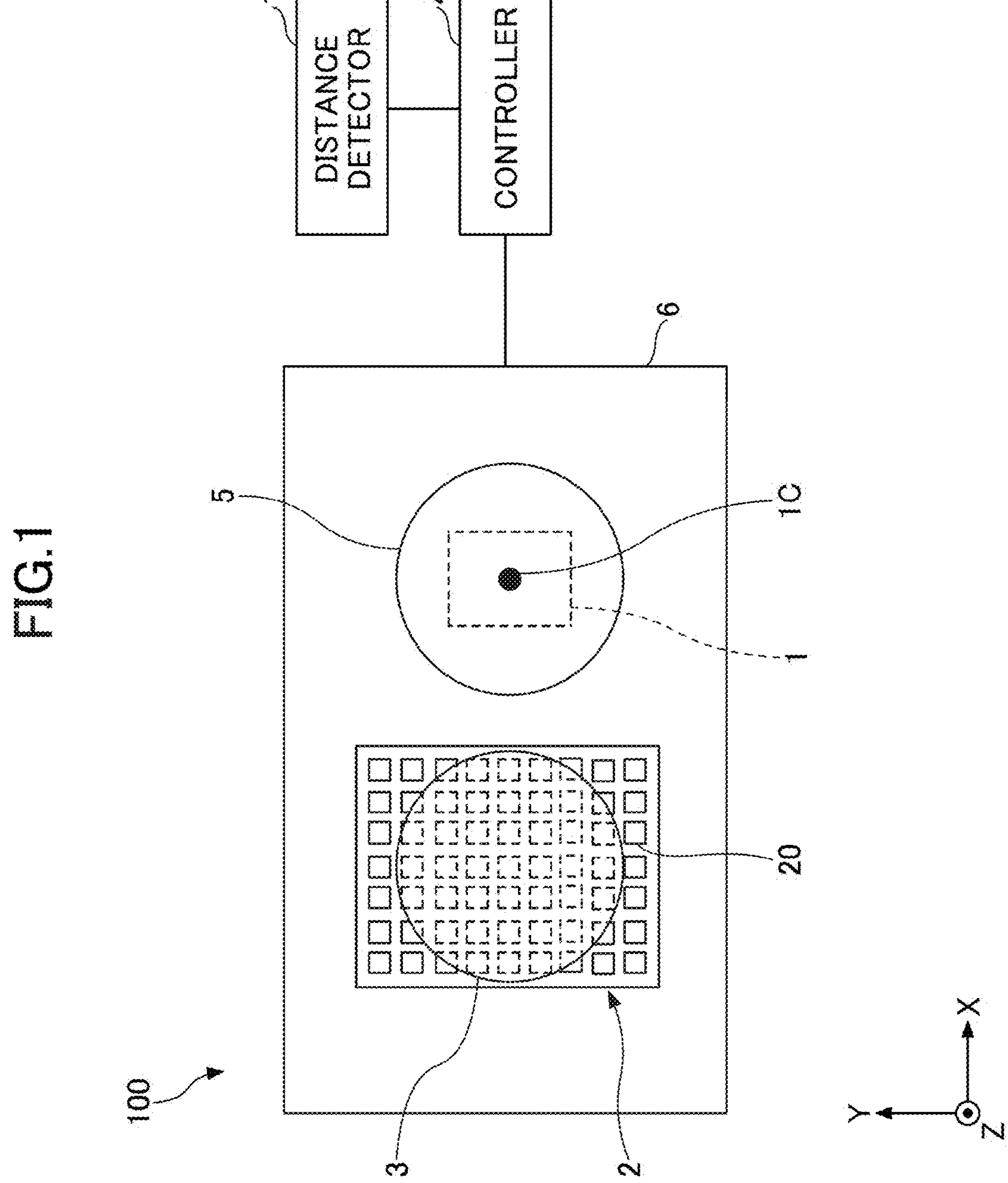
FIG. 1 is a schematic top view illustrating an overall configuration of an imaging device according to a first embodiment.

Imaging devices according to embodiments of the present disclosure will be described with reference to the accompanying drawings. The following embodiments exemplify the imaging devices to give a concrete form to the technical ideas of the present disclosure, but the present invention is not limited to the described embodiments. In addition, unless otherwise specified, the dimensions, materials, shapes, relative arrangements, and the like of components described in the embodiments are not intended to limit the scope of the present disclosure thereto, but are described as examples. The sizes, positional relationships, and the like of members illustrated in the drawings may be exaggerated for clearer illustration. Further, in the following description, the same names and reference numerals denote the same or similar members, and a detailed description thereof will be omitted as appropriate. An end view illustrating only a cut surface may be used as a cross-sectional view.

In the drawings, to indicate directions, an orthogonal coordinate system having an X-axis, a Y-axis, and a Z-axis is used. The X-axis, the Y-axis, and the Z-axis are orthogonal to one another. A direction indicated by an arrow in an X direction is referred to as a +X direction, and a direction opposite to the +X direction is referred to as a −X direction. The +X direction corresponds to a leftward direction, and the −X direction corresponds to a rightward direction. A direction indicated by an arrow in a Y direction is referred to as a +Y direction, and a direction opposite to the +Y direction is referred to as a −Y direction. A direction indicated by an arrow in a Z direction is referred to as a +Z direction, and a direction opposite to the +Z direction is referred to as a −Z direction. As an example, the imaging devices according to the embodiments are configured to emit light in the +Z direction, and capture an image of a subject by using light returning from the subject in the −Z direction.

The term “top view” as used in the embodiments refers to viewing an object from the +Z direction. In the embodiments described below, each of the phrases “along the X-axis,” “along the Y-axis,” and “along the Z-axis” includes a case where an object is at an inclination within a range of ±10° with respect to the corresponding one of the axes. Further, in the embodiments described below, “perpendicular to an axis” means that an angle formed with the axis is within a range of 90 degrees±10 degrees.

First Embodiment

Configuration of Imaging Device According to First Embodiment

Figure 2:
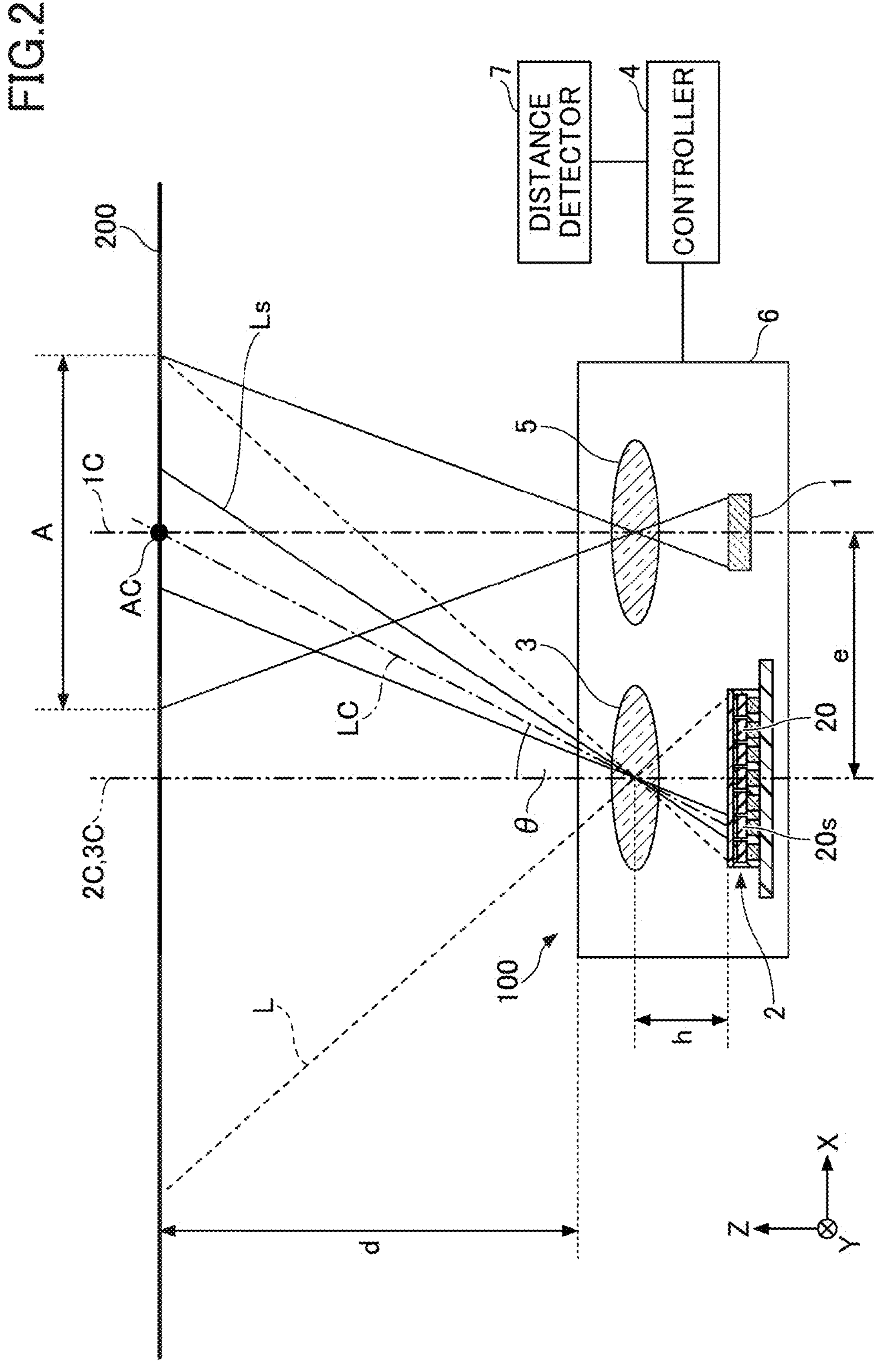
FIG. 2 is a schematic cross-sectional view illustrating the overall configuration of the imaging device according to the first embodiment.
Figure 3:
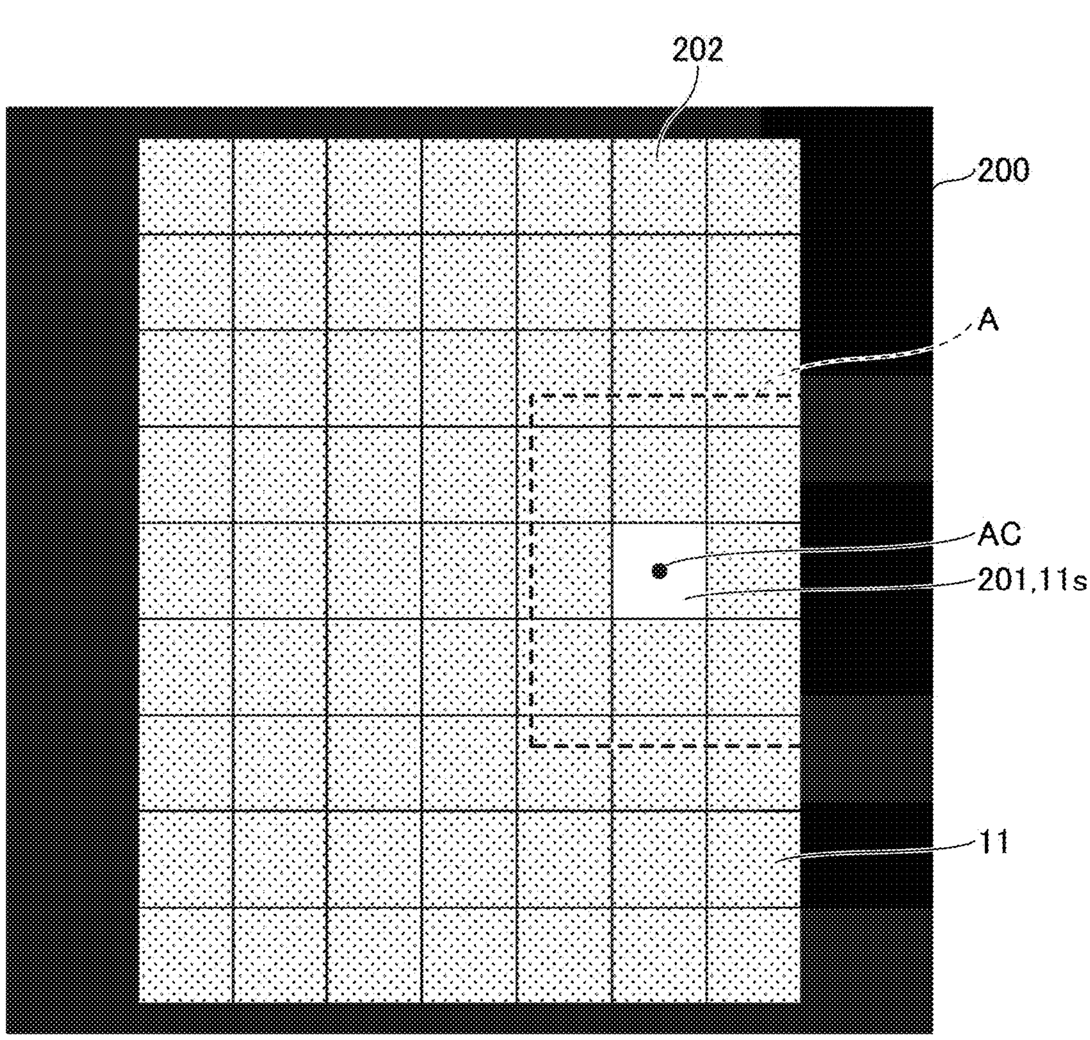
FIG. 3 is a drawing illustrating a first example of an irradiation surface irradiated with light from the imaging device according to the first embodiment and corresponding regions.
Figure 3:
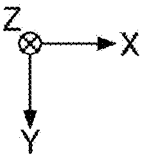
Figure 4:
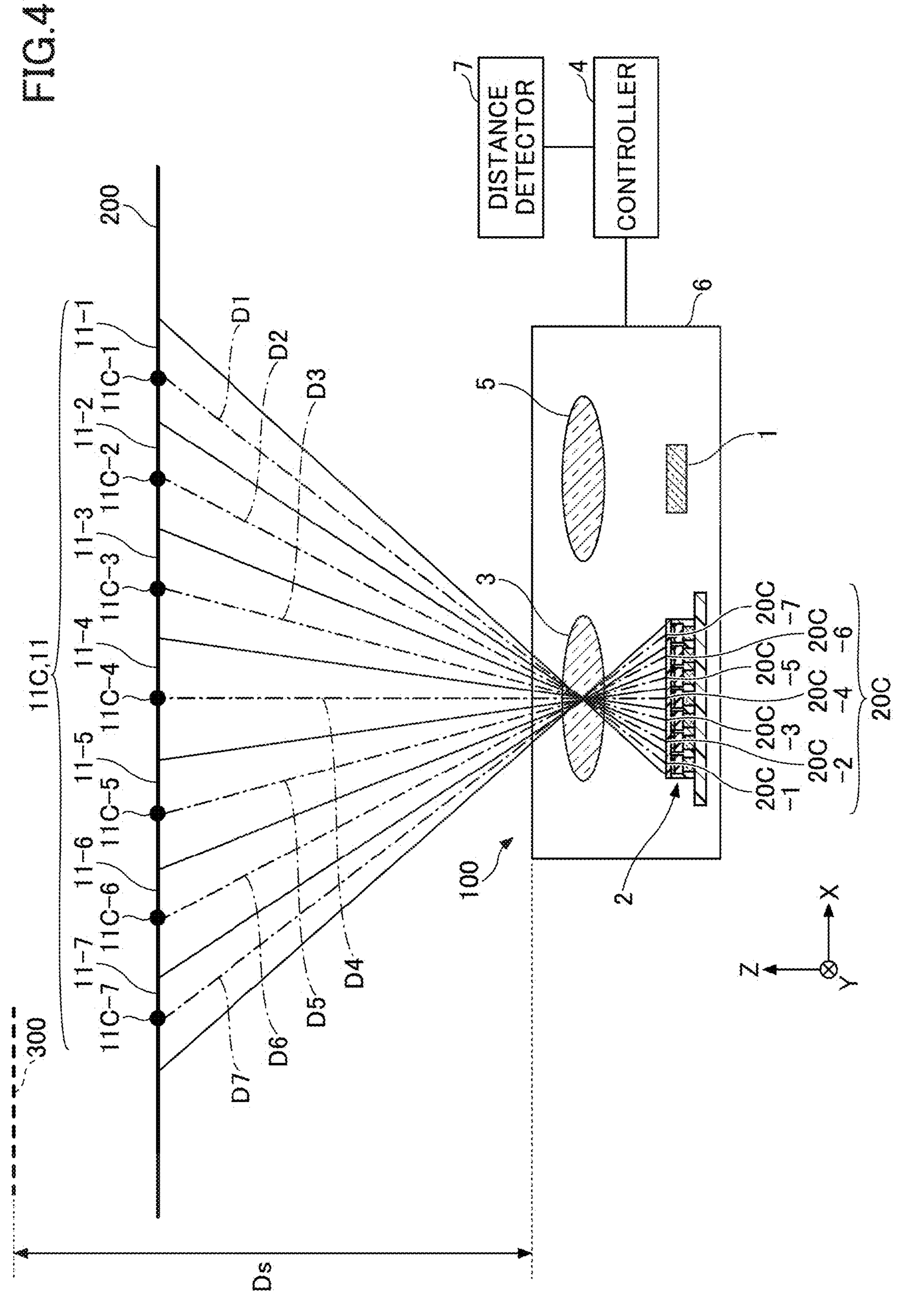
FIG. 4 is a drawing illustrating an example of a method of controlling the brightness of a plurality of light-emitting parts by the imaging device according to the first embodiment.
Figure 5:
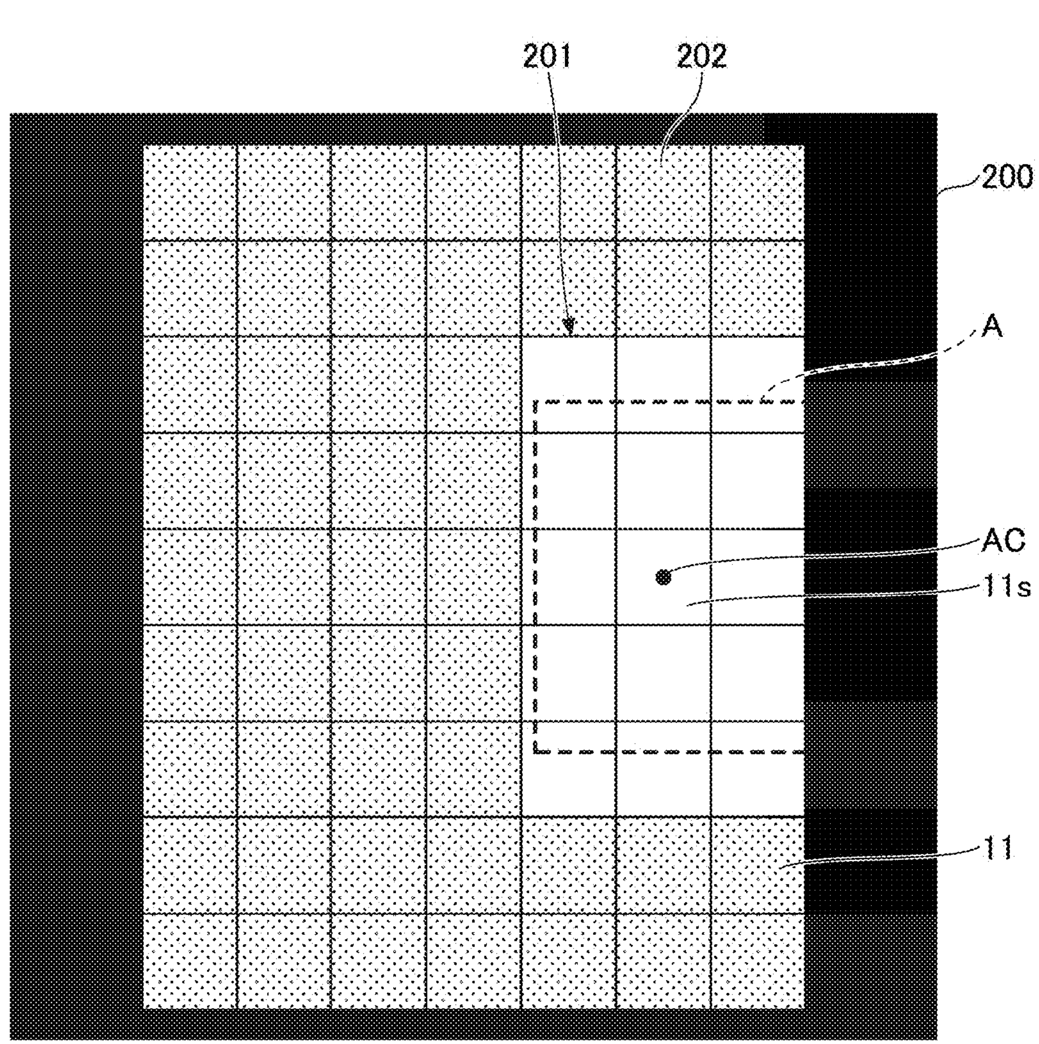
FIG. 5 is a drawing illustrating a second example of the irradiation surface irradiated with light from the imaging device according to the first embodiment and the corresponding region.
Figure 5:
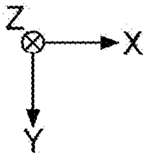
Figure 6:
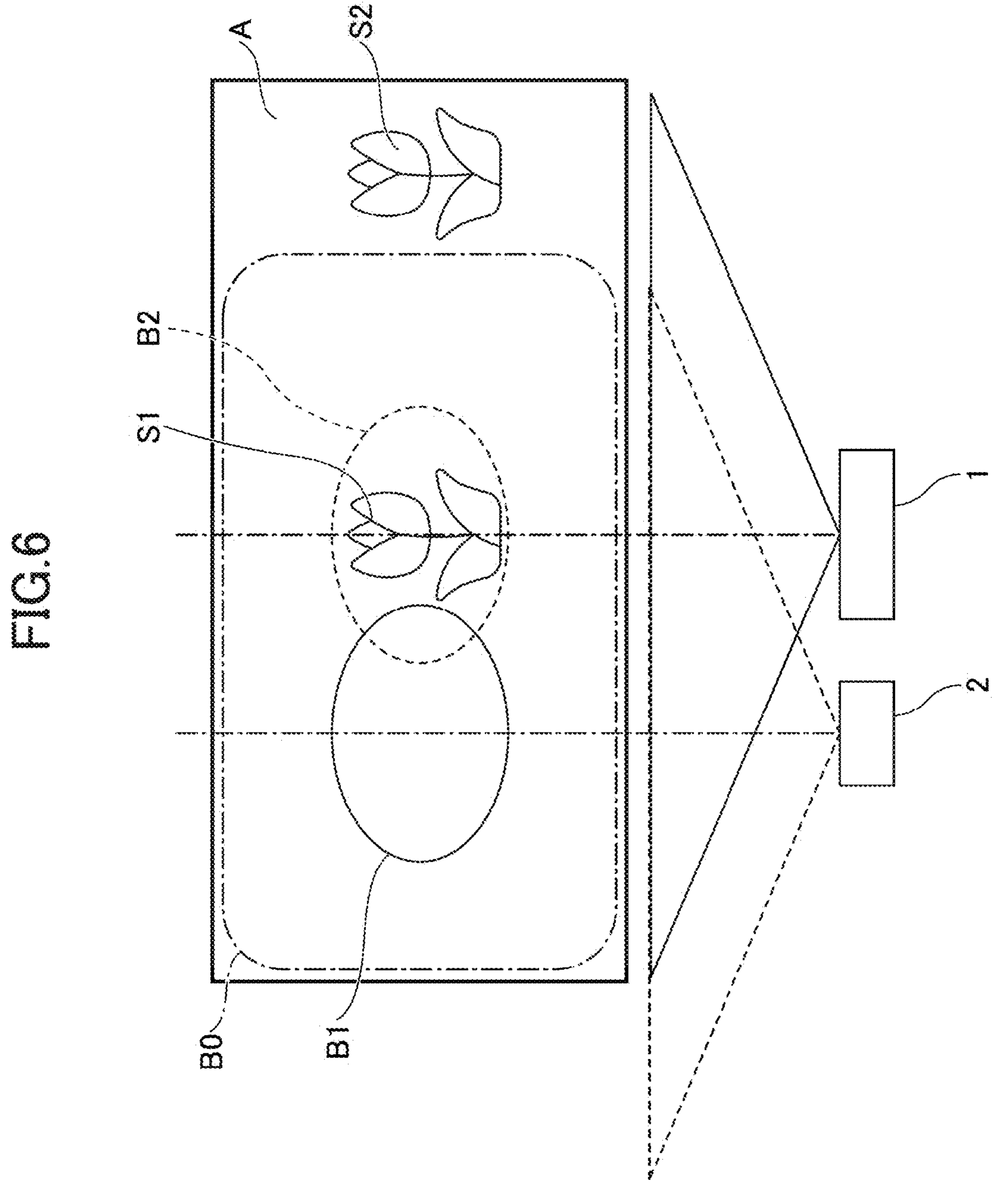
FIG. 6 is a drawing illustrating a deviation of irradiation light from a light-emitting device depending on the distance between an imaging element and the light-emitting device.

An imaging device according to a first embodiment will be described with reference to FIG. 1 to FIG. 6. FIG. 1 is a schematic top view illustrating an example of an overall configuration of an imaging device 100 according to the first embodiment. FIG. 2 is a schematic cross-sectional view illustrating an example of the overall configuration of the imaging device 100. FIG. 3 is a drawing illustrating a first example of an irradiation surface 200 irradiated with light from the imaging device 100 and corresponding regions 11. FIG. 4 is a drawing illustrating an example of a method of controlling the brightness of a plurality of light-emitting parts 20 by the imaging device 100. FIG. 5 is a drawing illustrating a second example of the irradiation surface 200 irradiated with light from the imaging device 100 and the corresponding region 11. FIG. 6 is a drawing illustrating an example of a deviation of irradiation light from a light-emitting device 2 depending on the distance between an imaging element 1 and the light-emitting device 2. FIG. 2 illustrates a cross section of the imaging device 100 including a central axis 1C of the imaging element 1 of the imaging device 100 and a central axis 2C of the light-emitting device 2 of the imaging device 100. The central axis 1C and the central axis 2C are axes extending in a direction along an optical axis 3C of a lens 3 of the imaging device 100. In the example illustrated in FIG. 2 and FIG. 4, a portion of light emitted from the light-emitting device 2 is indicated by a solid line or a dashed line. FIG. 3 and FIG. 5 illustrate the irradiation surface 200 irradiated with the irradiation light from the light-emitting device 2, as viewed from a direction in which the imaging device 100 is located.

As illustrated in FIG. 1 and FIG. 2, the imaging device 100 includes an imaging element 1, a light-emitting device 2 spaced apart from the imaging element 1 in a top view and including a plurality of light-emitting parts 20, and a lens 3 disposed above the light-emitting device 2. The imaging device 100 further includes a controller 4 configured to control light emission of the plurality of light-emitting parts 20 so as to control irradiation light L from the light-emitting device 2 on an irradiation surface that is perpendicular to the central axis 1C of the imaging element 1 and includes a central point AC of an imaging region A. In the example illustrated in FIG. 1 and FIG. 2, the imaging device 100 includes an imaging lens 5 that transmits light from a subject, a housing 6 within which the imaging element 1, the light-emitting device 2, the lens 3, and the imaging lens 5 are disposed, and a distance detector 7 configured to obtain and output information on a distance from the distance detector 7 to the irradiation surface 200. The controller 4 can select, as a reference light-emitting part 20*s* serving as a reference for controlling the irradiation light L, a light-emitting part 20 that can irradiate the central point AC of the imaging region A with light Ls. The light-emitting device 2 can irradiate the irradiation surface 200 with the irradiation light L, with the reference light-emitting part 20*s* as a reference.

In the example illustrated in FIG. 2, the irradiation light L obtained when all of the plurality of light-emitting parts 20 included in the light-emitting device 2 emit light is indicated by a dashed line, and the light Ls emitted from the reference light-emitting part 20*s* to the central point AC of the imaging region A is indicated by a solid line. In the example illustrated in FIG. 2 and FIG. 3, only the reference light-emitting part 20*s* among the plurality of light-emitting parts 20 emits light, and the other light-emitting parts 20 do not emit light.

In the example illustrated in FIG. 3 and FIG. 5, the corresponding regions 11 are regions of the irradiation surface 200 to be irradiated with light from the plurality of light-emitting parts 20. The plurality of light-emitting parts 20 are provided in one-to-one correspondence with the corresponding regions 11. The plurality of corresponding regions 11 are arranged in a matrix in the X direction and the Y direction so as to correspond to the plurality of light-emitting parts 20.

In FIG. 3 and FIG. 5, an irradiation region 201 shown in white is a region of the irradiation surface 200 irradiated with light emitted from the corresponding light-emitting part(s) 20. A reference region 11*s* in the irradiation region 201 is a region irradiated with the light Ls from the reference light-emitting part 20*s*. A non-irradiation region 202 indicated by dot hatching is a region of the irradiation surface 200 that is not irradiated with light from corresponding light-emitting parts 20 because the corresponding light-emitting parts 20 are not caused to emit light. A region shown in black is a region of the irradiation surface 200 where there are no corresponding regions 11. In the example illustrated in FIG. 3, only the reference region 11*s* is included in the irradiation region 201, and thus the reference numeral of the irradiation region 201 and the reference numeral of the reference region 11*s* are written in a similar manner.

The light-emitting device 2 can cause all of the plurality of light-emitting parts 20 included in the light-emitting device 2 to emit light, or can cause the plurality of light-emitting parts 20 to emit light individually or in groups. The imaging device 100 can perform partial irradiation on the irradiation surface 200 by causing the light-emitting device 2 to cause the plurality of light-emitting parts 20 to emit light individually or in groups. "Partial irradiation" means that a partial region of the irradiation surface 200 is irradiated with light. The irradiation light L is not limited to irradiation light realized when all of the plurality of light-emitting parts 20 included in the light-emitting device 2 emit light, and may be partial irradiation light.

For example, in an imaging device that captures an image by using irradiation light from a light-emitting device that is spaced apart from an imaging element, there would be a possibility that the irradiation light from the light-emitting device deviates in an image captured by the imaging device depending on the distance between the imaging element and the light-emitting device. For example, if the center of irradiation light deviates from the center of an imaging region of the imaging element, the center of the irradiation light would be located at a position deviated from the center of a captured image. Further, there would unintentionally be a region that is not irradiated with the irradiation light within the imaging angle of view. In particular, in close-up photography in which the distance to a subject is short and the distance to an irradiation surface is short, a deviation of irradiation light relative to the imaging region would become noticeable.

An example of a deviation of irradiation light relative to an imaging region depending on the distance between an imaging element and a light-emitting device will be described with reference to FIG. 6. For example, as illustrated in FIG. 6, an object S1 and an object S2 are located in an imaging region A. An entire irradiation region B0 is a region that can be irradiated with light from a light-emitting device 2. A partial irradiation region B1 is a region that is actually partially irradiated with light from the light-emitting device 2. An irradiation target region B2 is a region that is expected to be partially irradiated with light from the light-emitting device 2. The entire irradiation region B0, the partial irradiation region B1, and the irradiation target region B2 are regions included in the imaging region A. When partial irradiation is performed on the object S1 with a predetermined brightness, there would be a possibility that the partial irradiation region B1 is shifted from the irradiation target region B2 depending on the distance between the light-emitting device 2 and an imaging element 1. Further, depending on the distance between the light-emitting device 2 and the imaging element 1, the object S2 is located outside the entire irradiation region B0. In such a case, the object S2 would not be irradiated with sufficient irradiation light, and blocked-up shadows or the like would occur in an image captured by the imaging element 1.

In the present embodiment, the controller 4 can select, as a reference light-emitting part 20*s* serving as a reference for controlling the irradiation light L, a light-emitting part 20 that can irradiate the central point AC of the imaging region A with the light Ls. The reference light-emitting part 20*s* is a light-emitting part selected based on the distance between the imaging element 1 and the light-emitting device 2, and is a light-emitting part serving as a reference when irradiation light from the light-emitting device is generated. In general, light (including entire irradiation light and partial irradiation light) emitted from a light-emitting device is often generated with reference to the center of the light-emitting device in a plan view. Conversely, in the light-emitting device 2 according to the present embodiment, a reference light-emitting part is selected based on the distance between the imaging element 1 and the light-emitting device 2, and irradiation light is generated with the reference light-emitting part as a reference. When irradiation light of the light-emitting device is generated, the reference light-emitting part 20*s* is not necessarily required to emit light, and the reference light-emitting part 20*s* may or may not emit light.

For example, the controller 4 illustrated in FIG. 2 calculates and obtains an irradiation angle θ of light from the light-emitting device 2 to the central point AC of the imaging region A through the lens 3 based on an interval e between the central axis 1C of the imaging element 1 and the central axis 2C of the light-emitting device 2 and an irradiation distance d from the imaging device 100 to the irradiation surface 200. The irradiation angle θ is an angle formed by the central axis 2C of the light-emitting device 2 and a central axis LC along the traveling direction of the light emitted from the light-emitting device 2 to the central point AC of the imaging region A. In the example illustrated in FIG. 2, the central axis 2C of the light-emitting device 2 and the optical axis 3C of the lens 3 coincide with each other, and thus the reference numeral of the central axis 2C and the reference numeral of the optical axis 3C are written in a similar manner. The interval e between the central axis 1C of the imaging element 1 and the central axis 2C of the light-emitting device 2 can be determined in advance. Further, the irradiation distance d can be obtained based on information on a distance from the imaging device 100 to the irradiation surface 200 obtained by the distance detector 7. The controller 4 can identify and select a reference light-emitting part 20*s* that can irradiate the central point AC of the imaging region A with the light Ls, based on a lens distance h between the light-emitting device 2 and the lens 3 and the obtained irradiation angle θ. The light-emitting device 2 can irradiate the irradiation surface 200 with the irradiation light L having the light Ls emitted from the reference light-emitting part 20*s* as a reference. Accordingly, the imaging device 100 can emit the irradiation light L with the central point AC of the imaging region A as a reference. In the present embodiment, it is possible to provide the imaging device 100 that can reduce a deviation of the irradiation light L in a captured image by emitting the irradiation light L with the central point AC of the imaging region A as a reference.

The "irradiation light L with the light Ls as a reference" may be, for example, irradiation light realized when all of the plurality of light-emitting parts 20 emit light and the light Ls is located at the center of an irradiation region of the irradiation surface 200. Further, the "irradiation light L with the light Ls as a reference" may be, for example, partial irradiation light realized when only some of the plurality of light-emitting parts 20 emit light and the light Ls is located at the center of an irradiation region of the irradiation surface 200. As an example, the "irradiation light L with the light Ls as a reference" is partial irradiation light when all light-emitting parts 20 included in a group of light-emitting parts 20 adjacent to each other among the plurality of light-emitting parts 20 included in the light-emitting device 2 emit light and the light Ls is located at the center of an irradiation region of the irradiation surface 200.

In the example illustrated in FIG. 1 and FIG. 2, the light-emitting device 2 can irradiate a region on the irradiation surface 200 that is wider than the imaging region A of the imaging element 1 with light. For example, if the imaging angle of view of the imaging element 1 using the imaging lens 5 and the irradiation angle of view of the light-emitting device 2 using the lens 3 are substantially the same, and the imaging element 1 and the light-emitting device 2 are spaced apart from each other by the interval e, there would be a region that is not irradiated with irradiation light from the light-emitting device 2 in the imaging region A of the imaging element 1. This is particularly noticeable when close-up photography is performed. Conversely, in the imaging device 100, a region on the irradiation surface 200 that is wider than the imaging region A of the imaging element 1 can be irradiated with the irradiation light L. Thus, even when the close-up photography imaging is performed, the light-emitting device 2 can irradiate the entire imaging region A of the imaging element 1 with the irradiation light L.

In the example illustrated in FIG. 1 and FIG. 2, the plurality of light-emitting parts 20 are arranged at least along a direction in which the light-emitting device 2 and the imaging element 1 are arranged side by side. Specifically, in the example illustrated in FIG. 1 and FIG. 2, the light-emitting device 2 and the imaging element 1 are arranged side by side in the X direction, and the plurality of light-emitting parts 20 are arranged in the X direction and the Y direction, that is, at least in the X direction. Accordingly, the imaging device 100 can easily bring the center of the irradiation light L emitted from the plurality of light-emitting parts 20 onto the irradiation surface 200 close to the center of a captured image.

In the example illustrated in FIG. 4, the controller 4 can cause a light-emitting part 20 to emit light with brightness $Br_n$ represented by an equation (1) below, where Dn (n is an integer of 1 or more) represents the distance from a center 20C of a light-emitting surface of the light-emitting part 20 to a center 11C of a corresponding region 11, and Bs represents brightness preset at a reference distance Ds that is farther than the distance Dn. The brightness Bs indicates, for example, illuminance.

$$Br_n = Bs \times (1/Dn^2) \quad (1)$$

In the example illustrated in FIG. 4, the reference numeral representing the center 20C of the light-emitting surface of the light-emitting part 20 includes reference numerals representing a center 20C-1 to a center 20C-7 of light-emitting surfaces of respective light-emitting parts 20. The reference numeral representing the corresponding region 11 includes reference numerals representing centers 11-C1 to 11-C7 of respective corresponding regions 11. The center 20C-1 to the center 20C-7 of the light-emitting surfaces of the light-emitting parts 20 are in one-to-one correspondence with the center 11-C1 to the center 11-C7 of the corresponding regions 11. A reference position 300 is a position farther away than the distance Dn, and the reference distance Ds is a distance from the imaging device 100 to the reference position 300. Information on the reference position 300 and the reference distance Ds is stored in advance in a memory or the like, for example.

For example, in the imaging device 100, the irradiation angle of light from each of the plurality of light-emitting parts 20 to the irradiation surface 200 varies depending on the position of each of the plurality of light-emitting parts 20. In other words, distances Dn from the plurality of light-emitting parts 20 to the corresponding regions 11 of the irradiation surface 200 are different. Therefore, depending on the differences in the distances Dn, there would be variations in the brightness of irradiation light from each of the plurality of light-emitting parts 20 on the irradiation surface 200. By controlling each of the plurality of light-emitting parts 20 to emit light with brightness $Br_n$ represented by the above equation (1), the imaging device 100 can reduce, on the irradiation surface 200, irradiation unevenness of irradiation light from the plurality of light-emitting parts 20.

In the example illustrated in FIG. 5, the controller 4 is configured to cause, among the plurality of light-emitting parts 20, light-emitting parts 20, corresponding to regions at least partially included in the imaging region A of the imaging element 1, to emit light onto the irradiation surface 200, and is configured to cause, among the plurality of light-emitting parts 20, light-emitting parts 20, corresponding to regions not included at all in the imaging region A of the imaging element 1, not to emit light onto the irradiation surface 200. More specifically, fifteen corresponding regions 11 including the reference region 11*s* are regions at least partially included in the imaging region A of the imaging element 1 and corresponding to fifteen respective light-emitting part 20*s*. The controller 4 causes the fifteen light-emitting parts 20 corresponding to the fifteen regions at least partially included in the imaging region A of imaging element 1 to emit light, and causes light-emitting parts 20 other than the fifteen light-emitting parts 20 not to emit light. Accordingly, the irradiation region 201 is irradiated with the irradiation light L, and the non-irradiation region 202 is not irradiated with light. By causing the controller 4 to perform such control, the imaging device 100 can reduce the number of light-emitting parts 20 that are not used to capture an image by the imaging element 1 but emit light, and thus can reduce power required to drive the light-emitting parts 20. Accordingly, the power consumption of the imaging device 100 can be reduced.

Each component of the imaging device 100 will be described in detail below.

Imaging Element 1

An area sensor including a plurality of pixels arranged in two axial directions can be used as the imaging element 1. As the imaging element, a charge-coupled device (CCD), a complementary metal oxide semiconductor (CMOS), or the like can be used.

Lens 3 and Imaging Lens 5

Each of the lens 3 and the imaging lens 5 can include a glass material or a resin material having light transmissivity. The light transmissivity of each of the lens 3 and the imaging lens 5 preferably refers to having a light transmittance of 60% or more with respect to the emission peak wavelength of light emitted from the light-emitting device 2. As the lens 3 and the imaging lens 5, various lenses such as a spherical lens, an aspherical lens, a Fresnel lens, and a diffraction lens can be used. Each of the lens 3 and the imaging lens 5 may be configured by combining a plurality of lenses. Specifications such as the diameter, the angle of view, an F-number, and a focal length of each of the lens 3 and the imaging lens 5 can be selected as appropriate according to the application of the imaging device 100. Further, the imaging lens 5 may have an autofocus function, an automatic zoom function, and the like.

Housing 6

The housing 6 can include a metal material, a resin material, or the like. From the viewpoint of reducing stray light or the like at a time of image capturing, the housing 6 preferably has a light shielding property or light absorbability with respect to wavelengths of sunlight or light from an external lighting device or the like. The housing 6 may be provided with an exit window through which light emitted from the light-emitting device 2 passes, an incident window through which light to be incident on the imaging element 1 passes, and the like. The controller 4 and the distance detector 7 may be disposed in the housing 6.

Distance Detector 7

The distance detector 7 detects a distance from the distance detector 7 to the irradiation surface 200. The imaging device 100 can detect a distance from the imaging device 100 to the irradiation surface 200 based on the installation position of the distance detector 7, which is predetermined for the imaging device 100, and information on the distance detected by the distance detector 7.

As the distance detector 7, light detection and ranging (LiDAR) can be used. However, as long as the distance detector 7 can obtain information on a distance to the irradiation surface 200 and can output the information, a device or equipment other than the LiDAR, such as a millimeter wave radar, a time of flight (ToF) sensor, or a stereo camera, may be used as the distance detector 7. The distance detector 7 is not limited to a detector that outputs information directly indicating a distance to the irradiation surface 200. The distance detector 7 may be a detector that outputs a signal or data related to a distance to the irradiation surface 200, which does not directly indicate the distance to the irradiation surface 200.

Light-Emitting Device 2

Figure 7:
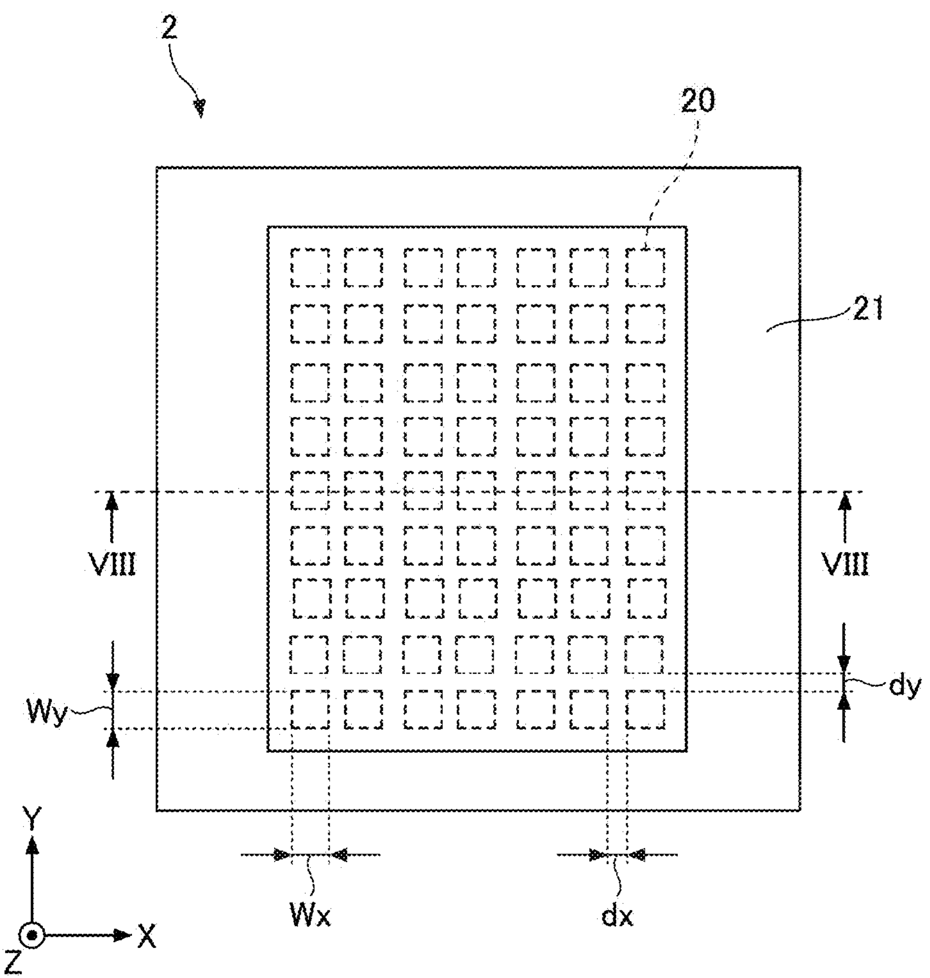
FIG. 7 is a schematic top view illustrating a light-emitting device of the imaging device according to the first embodiment.
Figure 8:
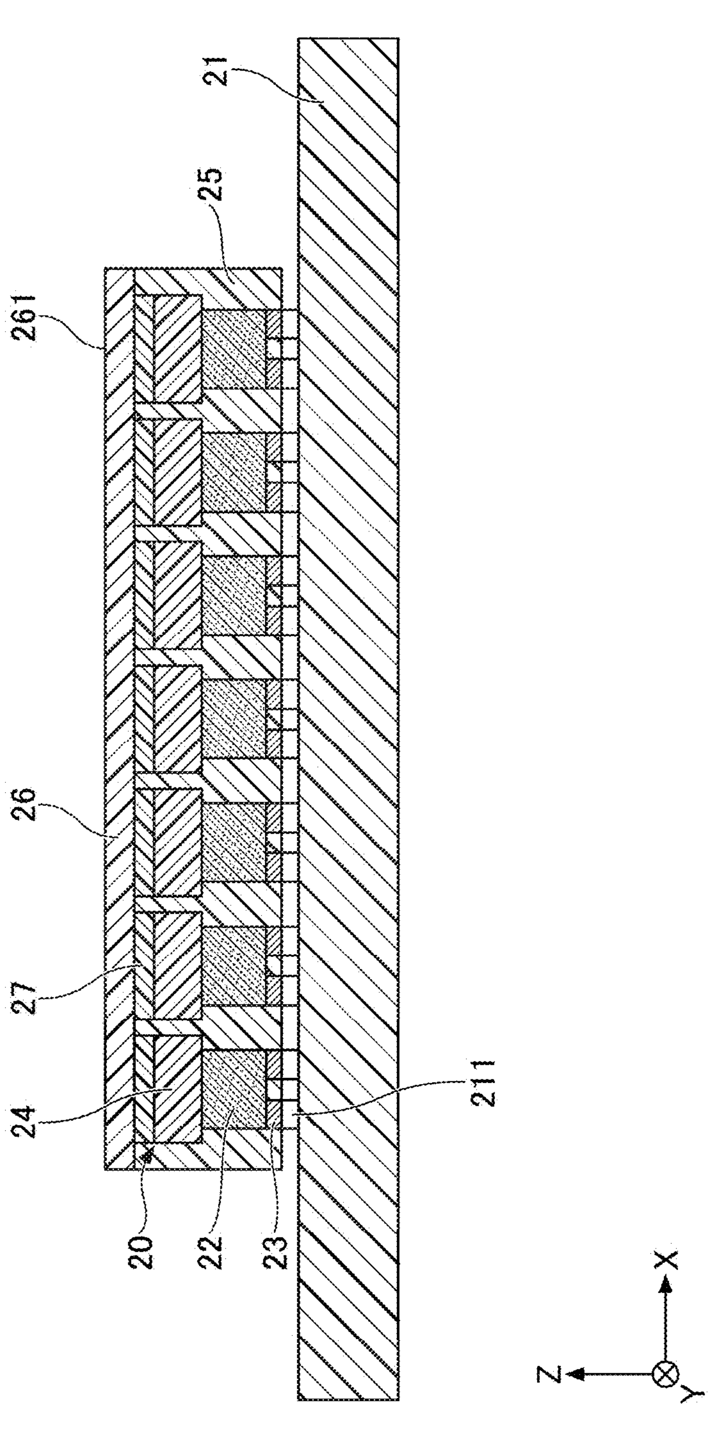
FIG. 8 is a cross-sectional view taken through line VIII-VIII of FIG. 7.

A configuration of the light-emitting device 2 will be described with reference to FIG. 7 and FIG. 8. FIG. 7 is a schematic top view illustrating an example of the light-emitting device 2. FIG. 8 is a cross-sectional view taken through line VIII-VIII of FIG. 7.

In the example illustrated in FIG. 7, the light-emitting device 2 includes a substrate 21, sixty-three light-emitting parts 20 arranged on the +Z side of the substrate 21, and a first light-transmissive member 26 disposed on the sixty-three light-emitting parts 20. In the example illustrated in FIG. 7, seven light-emitting parts 20 are arranged in the X direction, and nine light-emitting parts 20 are arranged in the Y direction. However, the number of the light-emitting parts 20 is not limited to sixty-three, and may be any number.

Each of the sixty-three light-emitting parts 20 emits light above the light-emitting device 2 through a light-emitting surface 261 that is the upper surface of the first light-transmissive member 26. The first light-transmissive member 26 is disposed across the sixty-three light-emitting parts 20. The light-emitting surface 261 refers to a main light extraction surface of the light-emitting device 2. The light emitted from each of the light-emitting parts 20 is preferably white light, but may be light having a specific wavelength, such as blue light. The wavelength and the chromaticity of the light emitted from each of the light-emitting parts 20 may be appropriately selected according to the intended use of the imaging device 100. The centers 20C of the light-emitting surfaces of the light-emitting parts 20 illustrated in FIG. 4 correspond to the centers of regions of the light-emitting surface 261 that correspond to a plurality of light-emitting parts 20.

In the example illustrated in FIG. 7 and FIG. 8, the substrate 21 is a plate-shaped member having a substantially rectangular shape in a top view. The substrate 21 includes wiring on which a plurality of light-emitting parts 20 can be mounted. The shape of the substrate 21 in a top view may be a substantially circular shape, a substantially elliptical shape, a substantially polygonal shape, or the like. As a base material of the substrate 21, an insulating material is preferably used, and also a material that does not easily transmit light emitted from the light-emitting parts 20, external light, or the like is preferably used. Further, as the base material of the substrate 21, a material having a certain strength is preferably used. Specifically, as the base material of the substrate 21, a ceramic such as alumina, aluminum nitride, mullite, or silicon nitride, or a resin such as a phenol resin, an epoxy resin, a polyimide resin, a bismaleimide-triazine resin (BT resin), polyphthalamide, or a polyester resin can be used.

In the example illustrated in FIG. 7, the sixty-three light-emitting parts 20 are arranged in the lengthwise direction or the widthwise direction or in a matrix in a top view. From another viewpoint, the sixty-three light-emitting parts 20 are arranged along the X direction or arranged along the Y direction. In the example illustrated in FIG. 7, the sixty-three light-emitting parts 20 are arranged along the X direction and the Y direction.

A first width Wx represents the width of a light-emitting part 20 in the X direction. A second width Wy represents the width of the light-emitting part 20 in the Y direction. The first width Wx and the second width Wy are, for example, 30 μm or more and 2,000 μm or less, and preferably 100 μm or more and 1,000 μm or less. The first width Wx and the second width Wy may be substantially equal to each other or may be different from each other. In the example illustrated in FIG. 7, adjacent light-emitting parts 20 are arranged at a predetermined interval in a top view. From the viewpoint of light emission characteristics of the light-emitting device 2, the narrower a first interval dx in the X direction and a second interval dy in the Y direction, the more preferable. However, there are limits to how narrow the intervals at which a plurality of light-emitting parts 20 are mounted can be made. To obtain good light emission characteristics while providing narrow intervals at which the plurality of light-emitting parts 20 can be mounted, the first interval dx and the second interval dy are both preferably 10 μm or more and 50 μm or less. In the example illustrated in FIG. 7, the shape of each of the plurality of light-emitting parts 20 in a top view is a substantially rectangular shape. However, the shape of each of the plurality of light-emitting parts 20 in a top view may be a substantially circular shape or a substantially elliptical shape, or may be a polygonal shape such as a substantially triangular shape or a substantially hexagonal shape.

In the example illustrated in FIG. 8, each of the plurality of light-emitting parts 20 includes a light-emitting element 22, a wavelength conversion member 24 disposed on the light-emitting element 22, a covering member 25 covering the lateral surfaces of the light-emitting element 22 and the lateral surfaces of the wavelength conversion member 24, and a second light-transmissive member 27 disposed on the wavelength conversion member 24.

The light-emitting parts 20, each including the light-emitting element 22 and the wavelength conversion member 24, can emit mixed color light in which a color of light emitted from the light-emitting element 22 and a color of light emitted from the wavelength conversion member 24 are mixed. The degree of freedom in the color of light emitted from each of the light-emitting parts 20 can be increased by the combination of the light-emitting element 22 and the wavelength conversion member 24. In addition, the light-emitting parts 20, each including the light-emitting element 22 and the wavelength conversion member 24, can reduce light leaking from the light-emitting parts 20 and the covering member 25, and thus the light extraction efficiency of the light-emitting parts 20 can be improved.

Further, the light-emitting device 2 includes the plurality of light-emitting parts 20, and the covering member 25 integrally holds a plurality of light-emitting elements 22 and a plurality of wavelength conversion members 24. In the example illustrated in FIG. 8, the covering member 25 is disposed between adjacent light-emitting elements 22 and between adjacent wavelength conversion members 24. In this manner, the covering member 25 integrally holds the plurality of light-emitting elements 22 and the plurality of wavelength conversion members 24 of the plurality of light-emitting parts 20. Because the light-emitting device 2 includes the plurality of light-emitting parts 20, the amount of light that can be emitted from the light-emitting device 2 can be increased. Further, the covering member 25 integrally holds the plurality of light-emitting elements 22 and the plurality of wavelength conversion members 24, and thus the light-emitting device 2 can be easily mounted.

At least one pair of positive and negative electrodes 23 are provided on the surface of a light-emitting element 22 opposite the light-emitting surface 261.

The light-emitting element 22 includes various semiconductors such as group III-V compound semiconductors and group II-VI compound semiconductors. As the semiconductors, nitride-based semiconductors such as $In_XAl_YGa_{1-X-Y}N$ ($0 \leq X$, $0 \leq Y$, $X+Y \leq 1$) are preferably used, and InN, AlN, GaN, InGaN, AlGaN, InGaAlN, and the like can also be used. The light-emitting element 22 is, for example, an LED or a laser diode (LD). The emission peak wavelength of the light-emitting element 22 is preferably 400 nm or more and 530 nm or less, more preferably 420 nm or more and 490 nm or less, and even more preferably 450 nm or more and 475 nm or less, from the viewpoint of emission efficiency, excitation of a wavelength conversion substance, and the like.

A wavelength conversion member 24 is a member having, for example, a substantially rectangular shape in a top view. The wavelength conversion member 24 is disposed so as to cover the upper surface of the light-emitting element 22. The wavelength conversion member 24 includes a wavelength conversion substance that converts a wavelength of at least a portion of light from the light-emitting element 22. The wavelength conversion member 24 can be formed by using a light-transmissive resin material or an inorganic material such as a ceramic or glass. As the resin material, a thermosetting resin such as a silicone resin, a silicone-modified resin, an epoxy resin, an epoxy-modified resin, or a phenol resin can be used. In particular, a silicone resin or a modified resin thereof having high light resistance and heat resistance is preferable. As used herein, "light-transmissive" means that 60% or more of the light from the light-emitting element 22 is preferably transmitted. Further, a thermoplastic resin such as a polycarbonate resin, an acrylic resin, a methylpentene resin, or a polynorbornene resin can be used for the wavelength conversion member 24. Further, the wavelength conversion member 24 may include a light diffusing substance in the resin described above. For example, the wavelength conversion member 24 may be a resin material, a ceramic, glass, or the like containing a wavelength conversion substance, a sintered body of a wavelength conversion substance, or the like. Further, the wavelength conversion member 24 may be a multilayer member in which a resin layer is disposed on the surface on the ±Z side of a formed body of a resin, a ceramic, glass, or the like.

Examples of a wavelength conversion substance included in the wavelength conversion member 24 include yttrium aluminum garnet based phosphors (for example, $(Y,Gd)_3(Al,Ga)_5O_{12}:Ce$), lutetium aluminum garnet based phosphors (for example, $Lu_3(Al,Ga)_5O_{12}:Ce$), terbium aluminum garnet based phosphors (for example, $Tb_3(Al,Ga)_5O_{12}:Ce$), CCA based phosphors (for example, $Ca_{10}(PO_4)_6Cl_2:Eu$), SAE based phosphors (for example, $Sr_4Al_{14}O_{25}:Eu$), chlorosilicate based phosphors (for example, $Ca_8MgSi_4O_{16}Cl_2:Eu$), silicate based phosphors (for example, $(Ba,Sr,Ca,Mg)_2SiO_4:Eu$), oxynitride based phosphors such as β-SiAlON based phosphors (for example, $(Si,Al)_3(O,N)_4:Eu$) and α-SiAlON based phosphors (for example, $Ca(Si,Al)_{12}(O,N)_{16}:Eu$), nitride based phosphors such as LSN based phosphors (for example, $(La, Y)_3Si_6N_{11}:Ce$), BSESN based phosphors (for example, $(Ba,Sr)_2Si_5N_8:Eu$), SLA based phosphors (for example, $SrLiAl_3N_4:Eu$), CASN based phosphors (for example, $CaAlSiN_3:Eu$), and SCASN based phosphors (for example, $(Sr,Ca)AlSiN_3:Eu$), fluoride based phosphors such as KSF based phosphors (for example, $K_2SiF_6:Mn$), KSAF based phosphors (for example, $K_2(Si_{1-x}Al_x)F_{6-x}:Mn$, where x satisfies $0<x<1$), and MGF based phosphors (for example, $3.5MgO \cdot 0.5MgF_2 \cdot GeO_2:Mn$), quantum dots having a Perovskite structure (for example, $(Cs,FA,MA)(Pb,Sn)(F,Cl,Br,I)_3$, where FA and MA represent formamidinium and methylammonium, respectively), II-VI quantum dots (for example, CdSe), III-V quantum dots (for example, InP), and quantum dots having a chalcopyrite structure (for example, $(Ag,Cu)(In,Ga)(S,Se)_2$). The wavelength conversion substances described above are particles. One of these wavelength conversion substances may be used alone, or two or more of these wavelength conversion substances may be used in combination.

The light-emitting device 2 uses a blue LED as the light-emitting element 22. The wavelength conversion member 24 includes a wavelength conversion substance that converts the wavelength of light emitted from the light-emitting element 22 into the wavelength of yellow light. Accordingly, the light-emitting device 2 can emit white light. As a light diffusing substance included in the wavelength conversion member 24, titanium oxide, barium titanate, aluminum oxide, silicon oxide, or the like can be used.

The covering member 25 is a member covering the lateral surfaces of the light-emitting element 22 and the lateral surfaces of the wavelength conversion member 24. The covering member 25 directly or indirectly covers the lateral surfaces of the light-emitting element 22 and the lateral surfaces of the wavelength conversion member 24. The covering member 25 may be separated between adjacent light emitting parts of the sixty-three light-emitting parts 20. To improve the light extraction efficiency, the covering member 25 is preferably formed of a member having a high light reflectance. For example, an organic material such as a resin containing a light reflective substance such as a white pigment can be used for the covering member 25. For example, the covering member 25 may be a light reflective member formed of an inorganic material including boron nitride or alkali metal silicate. In this case, the covering member 25 may further include titanium oxide or zirconium oxide.

Examples of the light reflective substance include titanium oxide, zinc oxide, magnesium oxide, magnesium carbonate, magnesium hydroxide, calcium carbonate, calcium hydroxide, calcium silicate, magnesium silicate, barium titanate, barium sulfate, aluminum hydroxide, aluminum oxide, zirconium oxide, silicon oxide, and the like. It is preferable to use one of the above substances alone or a combination of two or more of the above substances. Further, as the resin material, it is preferable to use a base material including a resin material whose main component is a thermosetting resin such as an epoxy resin, an epoxy-modified resin, a silicone resin, a silicone-modified resin, or a phenol resin. The covering member 25 may be configured with a member having light transmissivity or light absorbability with respect to visible light as necessary.

A light-emitting part 20 is electrically connected to wiring 211 of the substrate 21. The substrate 21 preferably includes the wiring 211 at least on the surface of the substrate 21. The substrate 21 may include the wiring 211 inside the substrate 21. The light-emitting part 20 and the substrate 21 are electrically connected to each other by connecting the wiring 211 of the substrate 21 to at least a pair of positive and negative electrodes 23 of the light-emitting part 20 via electrically-conductive members. The configuration, the size, and the like of the wiring 211 of the substrate 21 are set in accordance with the configuration, the size, and the like of the electrodes 23 of the light-emitting part 20.

The wiring 211 can be composed of at least one of copper, iron, nickel, tungsten, chromium, aluminum, silver, gold, titanium, palladium, rhodium, or an alloy thereof. In addition, a layer of silver, platinum, aluminum, rhodium, gold, an alloy thereof, or the like may be provided on the surface layer of the wiring 211 from the viewpoint of wettability and light reflectivity of the electrically-conductive members that connect the wiring 211 and the electrodes 23.

In the example illustrated in FIG. 8, seven light-emitting parts 20 include respective light-emitting elements 22 and respective wavelength conversion members 24. Electrodes 23 of each of the light-emitting elements 22 are electrically connected to respective wirings 211 of the substrate 21.

The first light-transmissive member 26 and the second light-transmissive member 27 include, for example, a light diffusing substance, and efficiently mix light emitted from the light-emitting element 22 and light emitted from the wavelength conversion member 24. Further, the first light-transmissive member 26 collectively covers the upper surfaces of a plurality of light-emitting parts 20 and the upper surface of the covering member 25 disposed between adjacent ones of the light-emitting parts 20. If the light-emitting device does not include a first light-transmissive member, the color of the upper surfaces of the light-emitting parts 20 would differ from the color of the upper surface of the covering member 25 when the light-emitting device 2 is viewed from above when light is not emitted. For example, the color of the upper surfaces of the light-emitting parts 20 could be a color corresponding to the wavelength conversion substance included in the wavelength conversion member 24, and the color of the upper surface of the covering member 25 could be a color corresponding to a light diffusing substance included in the covering member 25. In the light-emitting device 2, the first light-transmissive member 26 including the light diffusing substance collectively covers the plurality of light-emitting parts 20 and the covering member 25, and thus a difference in color between the light-emitting parts 20 and the covering member 25 can be reduced. Accordingly, the light-emitting device can have a good appearance in a non-light emission state. The light-emitting device having a good appearance refers to, for example, the light-emitting device having a simple appearance in which a difference in color between parts is not emphasized in a non-light emission state. For example, when the light-emitting device 2 is used as a flash light source in a mobile communication terminal, the light-emitting device 2 can be visually recognized from the outside of the housing. In this case, if the light-emitting device 2 has a simple appearance, the degree of freedom in designing the mobile communication terminal can be improved without impairing the appearance of the entire mobile communication terminal. The first light-transmissive member 26 does not necessarily collectively cover the plurality of light-emitting parts 20 and the covering member 25. For example, the first light-transmissive member 26 may include a plurality of light-transmissive layers, and the plurality of light-transmissive layers may be disposed on respective second light-transmissive members 27 so as to be spaced apart from each other.

The first light-transmissive member 26 and the second light-transmissive member 27 can include, for example, the light diffusing substance and the above-described resin material or the like used for the wavelength conversion member 24.

Hardware Configuration of Controller 4

Figure 9:
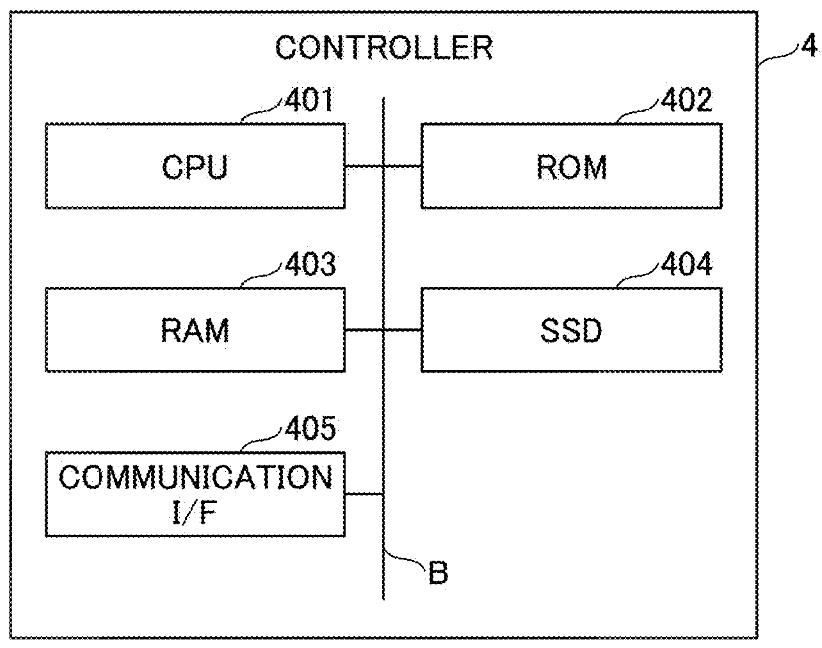
FIG. 9 is a block diagram illustrating a hardware configuration of a controller of the imaging device according to the first embodiment.

FIG. 9 is a block diagram illustrating an example hardware configuration of the controller 4. The controller 4 includes a central processing unit (CPU) 401, a read only memory (ROM) 402, a random access memory (RAM) 403, a solid state drive (SSD) 404, and a communication interface (I/F) 405. The above components are communicably connected to one another via a system bus B.

The controller 4 is communicably connected to the imaging element 1, the light-emitting device 2, and the distance detector 7 via the communication I/F 405. The imaging device 100 may further include a display and the like configured to display various notifications, and the display and the like may be communicably connected to the controller 4.

The CPU 401 executes control processing including various kinds of arithmetic processing. The ROM 402 is a nonvolatile memory that stores programs, such as an initial program loader (IPL), used to drive the CPU 401. The RAM 403 is a volatile memory used as a work area for the CPU 401. The SSD 404 is a nonvolatile memory that can store information on distances input from the distance detector 7, various information such as captured images obtained by the imaging element 1, programs, and the like. The communication I/F 405 is an interface for communication between the controller 4 and devices other than the controller 4. In the imaging device 100, examples of the devices other than the controller 4 include the imaging element 1, the light-emitting device 2, the distance detector 7, and external devices such as a personal computer (PC).

Functional Configuration of Controller 4

Figure 10:
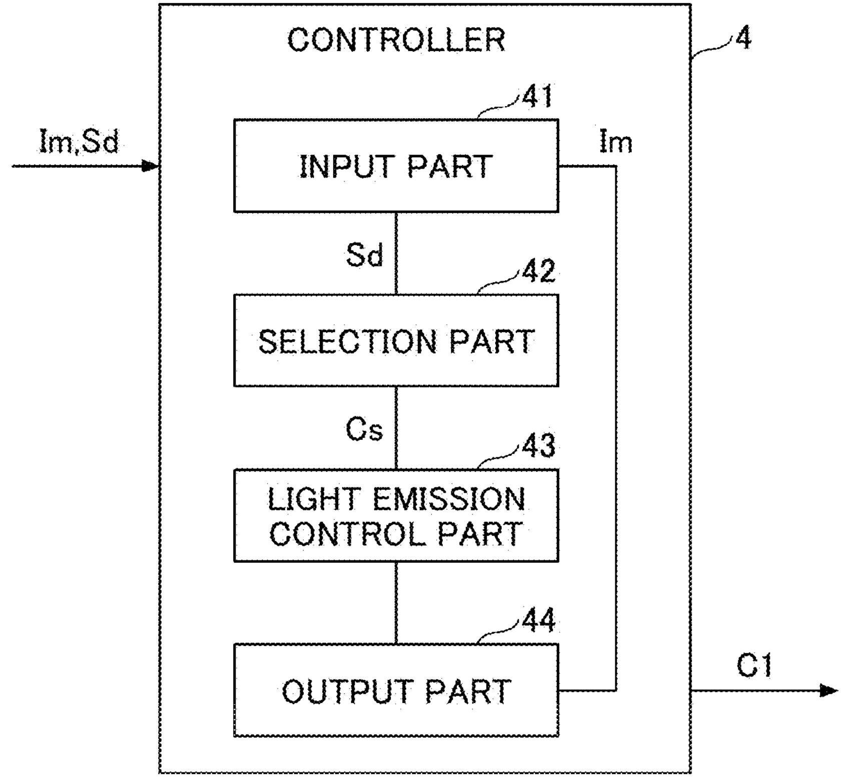
FIG. 10 is a block diagram illustrating a functional configuration of the controller of the imaging device according to the first embodiment.

FIG. 10 is a block diagram illustrating an example of a functional configuration of the controller 4 of the imaging device 100. The controller 4 illustrated in FIG. 10 includes an input part 41, a selection part 42, a light emission control part 43, and an output part 44. Functions of the input part 41 and the output part 44 can be implemented by the communication I/F 405 and the like. Some of the functions of the input part 41 and the output part 44 may be implemented by the CPU 401 executing processing defined in a program stored in the ROM 402. Functions of the selection part 42 and the light emission control part 43 can be implemented by the CPU 401 executing processing defined in a program stored in the ROM 402.

Functions of the controller 4 can also be implemented by one or more processing circuits. Examples of the processing circuits include an application-specific integrated circuit (ASIC), a field-programmable gate array (FPGA), a digital signal processor (DSP), an electric circuit, and the like that can execute the functions described above. Further, some of the functions of the controller 4 may be implemented by an external device such as a PC communicably connected to the controller 4. Further, some of the functions of the controller 4 may be implemented by distributed processing between the controller 4 and an external device.

The input part 41 receives, from the imaging element 1, a plurality of captured images Im by controlling communication between the imaging element 1 and the controller 4. Further, the input part 41 receives, from the distance detector 7, information Sd on a distance by controlling communication between the distance detector 7 and the controller 4.

The selection part 42 selects, as a reference light-emitting part 20*s* serving as a reference for controlling irradiation light L, a light-emitting part 20 that can irradiate the central point AC of the imaging region A with light Ls, based on the information Sd on the distance input from the distance detector 7 via the input unit 41. For example, the selection part 42 calculates and obtains an irradiation angle θ of light from the light-emitting device 2 to the central point AC of the imaging region A through the lens 3 based on an interval e and an irradiation distance d as described above with reference to FIG. 2. The selection part 42 can specify and select a reference light-emitting part 20*s* that can irradiate the central point AC of the imaging region A with light Ls, based on a lens distance h between the light-emitting device 2 and the lens 3 and the obtained irradiation angle θ. The selection part 42 passes selection information Cs indicating the selected reference light-emitting part 20*s* to the light emission control part 43.

The light emission control part 43 controls the light emission of the light-emitting device 2 via the output part 44 such that the irradiation surface 200 is irradiated with irradiation light L with the reference light-emitting part 20*s* as a reference. For example, based on the selection information Cs indicating the reference light-emitting part 20*s*, the light emission control part 43 selects a plurality of light-emitting parts 20 to emit light with the reference light-emitting part 20*s* as a reference. For example, the light emission control part 43 causes the light-emitting device 2 to emit irradiation light L including light from the reference light-emitting part 20*s* and light from each of the plurality of selected light-emitting parts 20. The light emission control part 43 can cause all of a plurality of light-emitting parts 20 included in the light-emitting device 2 to emit light, or can cause the plurality of light-emitting parts 20 to emit light individually or in groups.

The light emission control part 43 can control the brightness of light emitted from each of the plurality of light-emitting parts 20 included in the light-emitting device 2 via the output unit 44. Specifically, the light emission control part 43 can cause the plurality of light-emitting parts 20 to emit light with brightness $Br_n$ represented by the above equation (1).

The output part 44 outputs a control signal C1 from the light emission control part 43 to the light-emitting device 2 by controlling communication between the light-emitting device 2 and the controller 4. Further, the output part 44 can output the captured images Im, received from the imaging element 1 via the input part 41, to an external device such as a PC by controlling communication between the controller 4 and the external device.

Operation of Imaging Device 100

Figure 11:
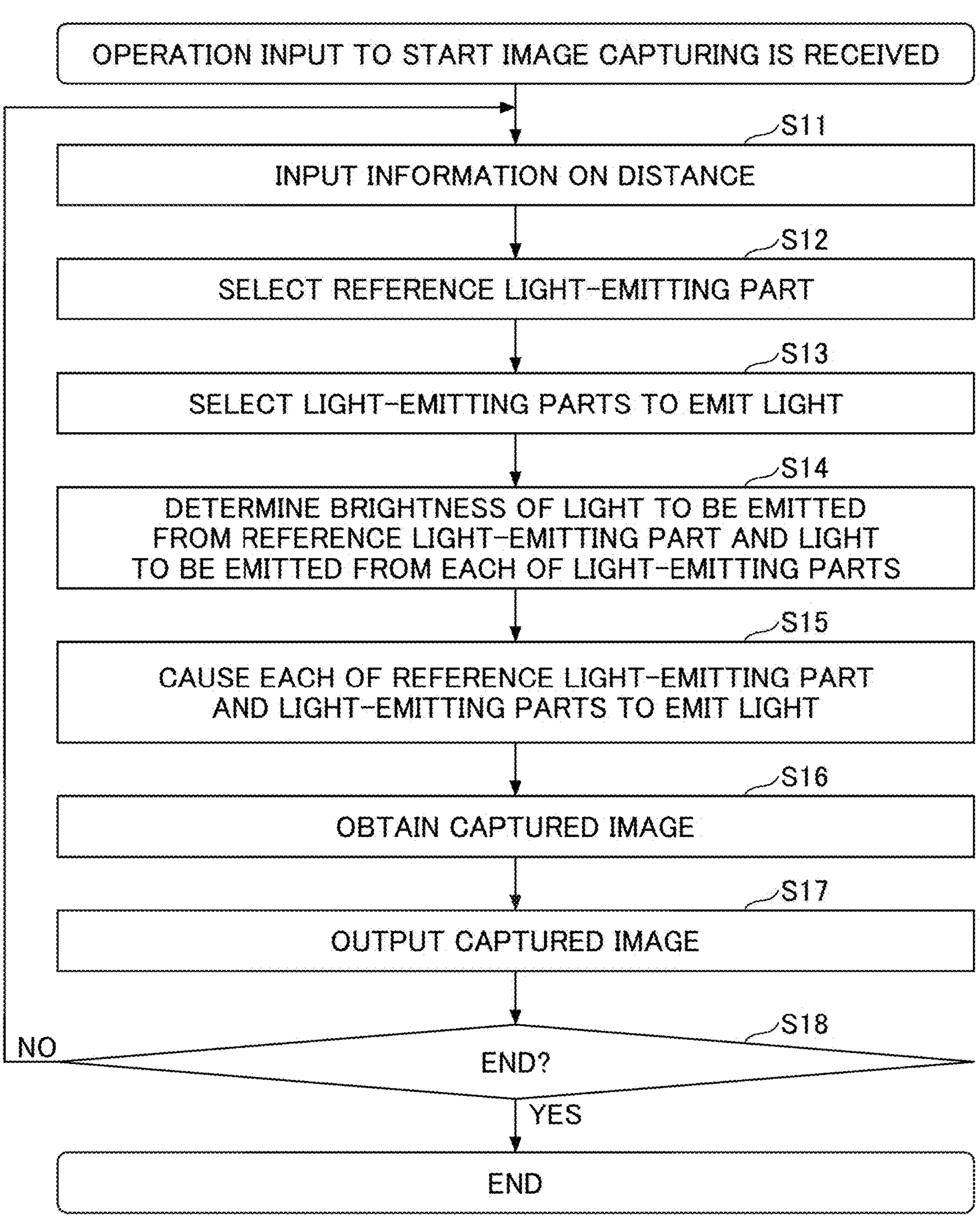
FIG. 11 is a flowchart illustrating the operation of the imaging device according to the first embodiment.

FIG. 11 is a flowchart illustrating an example of the operation of the imaging device 100. For example, the imaging device 100 starts a process illustrated in FIG. 11 on the condition that an operation input to start image capturing is received from an operator through an operation part of the imaging device 100.

First, in step S11, the imaging device 100 causes the distance detector 7 to obtain information Sd on a distance, and inputs the obtained information Sd on the distance into the controller 4 via the input unit 41.

Subsequently, in step S12, the imaging device 100 causes the selection part 42 to select, as a reference light-emitting part 20*s* serving as a reference for controlling irradiation light L, a light-emitting part 20 that can irradiate the central point AC of the imaging region A with light Ls, based on the input information Sd on the distance. The selection part 42 passes selection information Cs indicating the selected reference light-emitting part 20*s* to the light emission control part 43.

Subsequently, in step S13, the imaging device 100 causes the light emission control part 43 to select light-emitting parts 20 to emit light with the reference light-emitting part 20*s* as a reference, based on the selection information Cs indicating the reference light-emitting part 20*s*.

Subsequently, in step S14, the imaging device 100 causes the light emission control part 43 to determine brightness $Br_n$ of light to be emitted from the reference light-emitting part 20*s* and light to be emitted from each of the light-emitting parts 20, among light-emitting parts 20 included in the light-emitting device 2, by using the above equation (1).

Subsequently, in step S15, the imaging device 100 causes the light emission control part 43 to output a control signal C1 to the light-emitting device 2 via the output part 44, thereby causing each of the reference light-emitting part 20*s* and the light-emitting parts 20, among the light-emitting parts 20 included in the light-emitting device 2, to emit light with the brightness $Br_n$ determined in step S14. Accordingly, the imaging device 100 can cause the light-emitting device 2 to irradiate the irradiation surface 200 with the irradiation light L.

Subsequently, in step S16, the imaging device 100 causes the imaging element 1 to capture an image Im. The imaging device 100 inputs the captured image Im into the controller 4 via the input unit 41. The imaging device 100 can cause the imaging element 1 to perform image capturing in accordance with a time at which the light-emitting device 2 irradiates the irradiation surface 200 with the irradiation light L. After the captured image Im is obtained by the imaging element 1, the imaging device 100 causes the imaging element 1 to stop image capturing. The light-emitting device 2 stops emitting the irradiation light L after the irradiation light Lis emitted for a predetermined irradiation period of time. The imaging device 100 may cause the light-emitting device 2 to stop emitting the irradiation light L in accordance with a time at which the imaging element 1 stops image capturing.

Subsequently, in step S17, the imaging device 100 causes the captured image Im, input into the controller via the input unit 41, to be output to an external device such as a PC. The imaging device 100 may store the captured image Im in the SSD 404 or display the captured image Im on a display such as a liquid crystal panel included in the imaging device 100, without outputting the captured image Im to an external device.

Subsequently, in step S18, the imaging device 100 determines whether to end image capturing. For example, the imaging device 100 determines to end image capturing when an operation input to end image capturing is received through the operation part of the imaging device 100, and determines not to end image capturing when an operation input to end image capturing is not received.

If the imaging device 100 determines not to end image capturing in step S18 (NO in step S18), the imaging device

100 performs step S11 and the subsequent steps again, and repeats step S11 and the subsequent steps until the imaging device 100 determines to end image capturing. Conversely, if the imaging device 100 determines to end image capturing in step S18 (YES in step S18), the imaging device 100 ends the process.

As described above, the imaging device 100 can perform image capturing by using the irradiation light L from the light-emitting device 2.

Second Embodiment

Next, an imaging device according to a second embodiment will be described. The same names and reference numerals as those in the above-described embodiment denote the same or similar members or configurations, and a detailed description thereof will be omitted as appropriate. The same applies to embodiments to be described later.

Configuration of Imaging Device According to Second Embodiment

Figure 12:
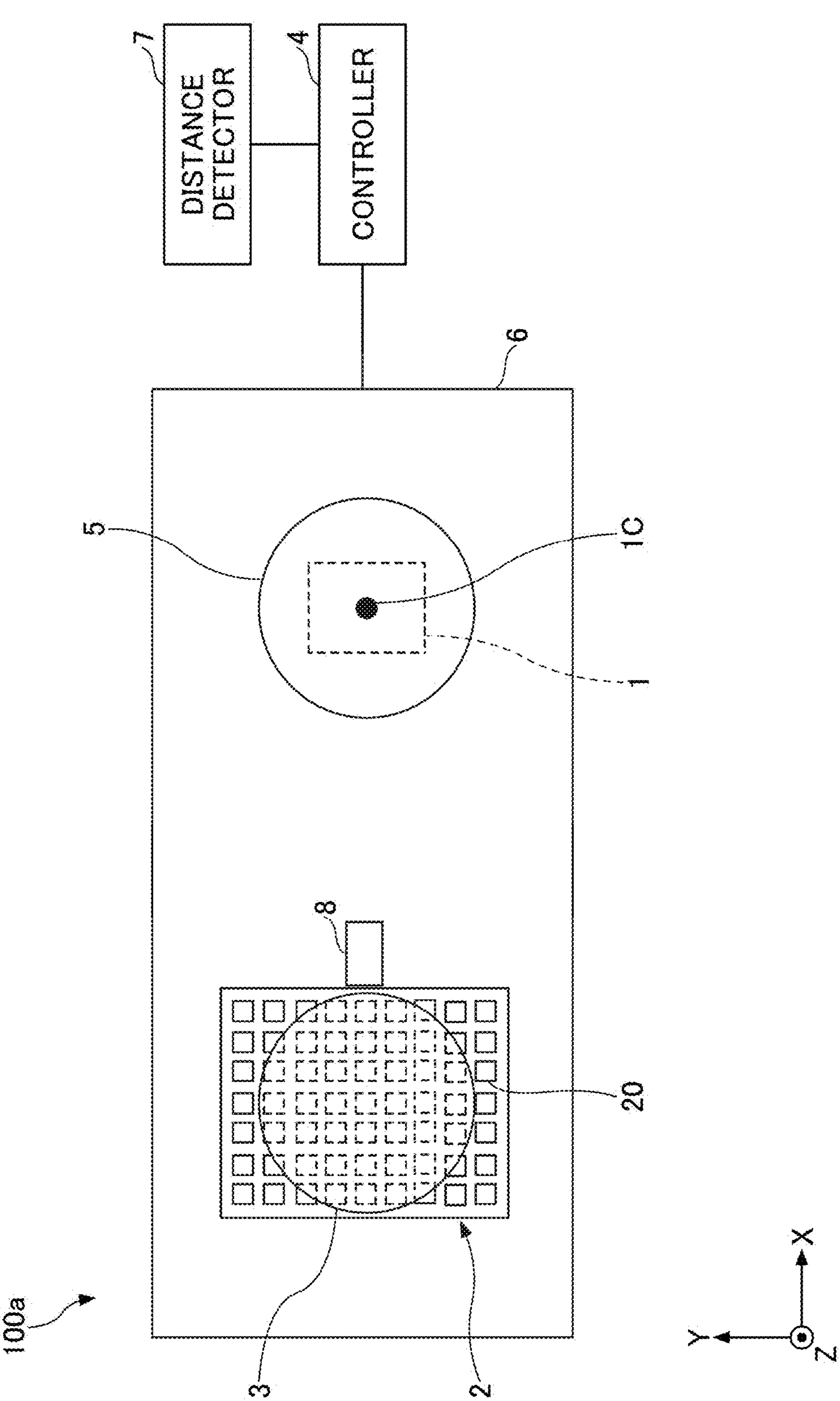
FIG. 12 is a schematic top view illustrating an overall configuration of an imaging device according to a second embodiment.
Figure 13:
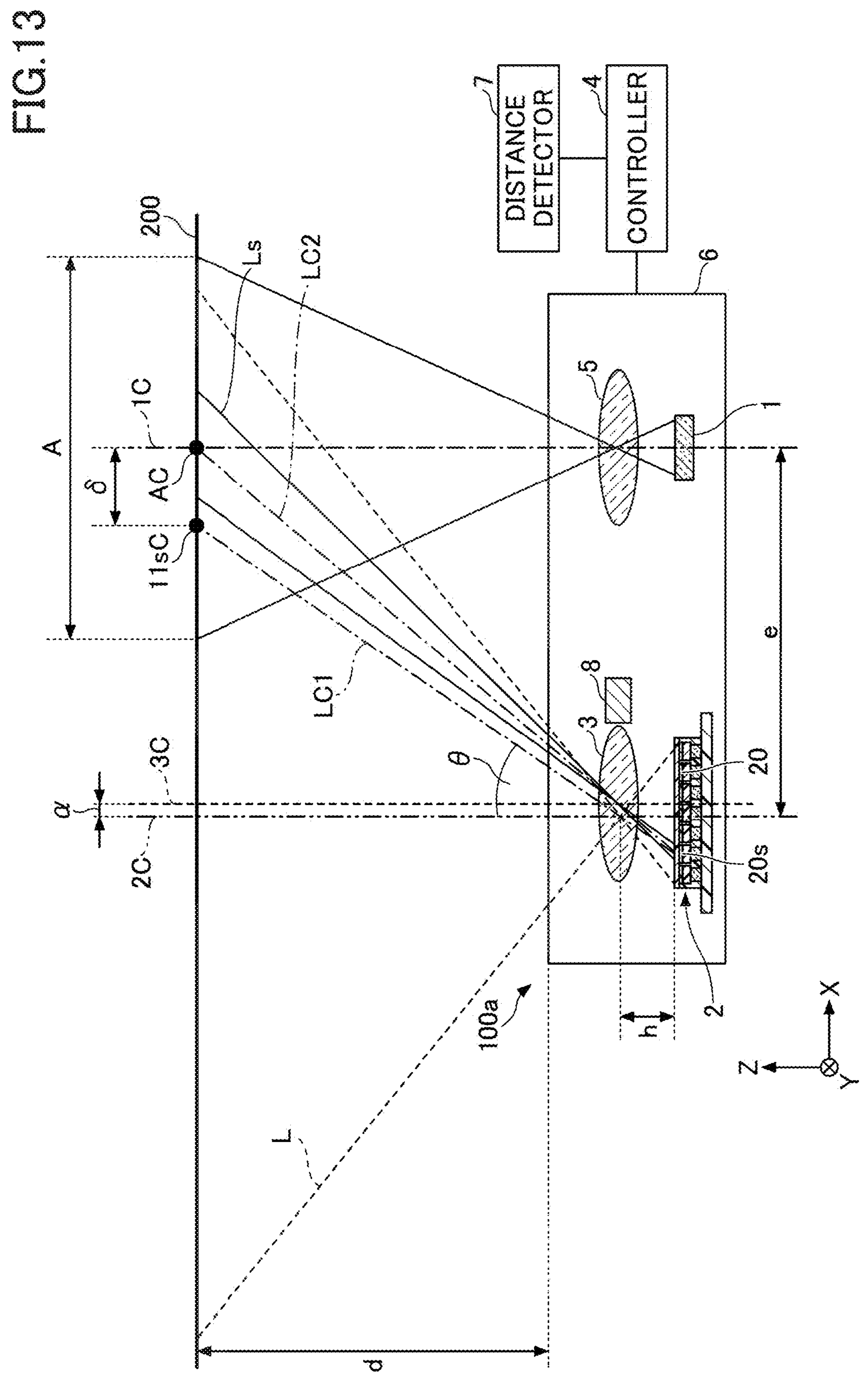
FIG. 13 is a schematic cross-sectional view illustrating the overall configuration of the imaging device according to the second embodiment.

The imaging device according to the second embodiment will be described with reference to FIG. 12 and FIG. 13. FIG. 12 is a schematic top view illustrating an example of an overall configuration of an imaging device 100*a* according to the second embodiment. FIG. 13 is a schematic cross-sectional view illustrating an example of the overall configuration of the imaging device 100*a*. FIG. 13 illustrates a cross section of the imaging device 100*a* including a central axis 1C of an imaging element 1 of the imaging device 100*a* and a central axis 2C of a light-emitting device 2 of the imaging device 100*a*. In the example illustrated in FIG. 13, a portion of light emitted from the light-emitting device 2 is indicated by a solid line or a dashed line.

As illustrated in FIG. 12 and FIG. 13, the imaging device 100*a* includes an actuator 8 configured to move a lens 3. A controller 4 can detect a positional deviation δ between a center 11*s*C of a reference region 11*s*, which is a region corresponding to a reference light-emitting part 20*s*, and a central point AC of an imaging region A on an irradiation surface 200. The actuator 8 moves the lens 3 such that the center 11*s*C of the reference region 11*s* and the central point AC of the imaging region A coincide with each other on the irradiation surface 200, based on information detected by the controller 4. The present embodiment differs from the first embodiment mainly in the above-described points. In other words, the operation of the imaging device 100*a* according to the second embodiment is the same as that of the imaging device 100 according to the first embodiment until a reference light-emitting part 20*s* is selected, and the second embodiment further includes a step of moving the lens 3.

In the example illustrated in FIG. 13, a dashed line indicates a portion of irradiation light L obtained when all of a plurality of light-emitting parts 20 included in the light-emitting device 2 emit light in a state in which the optical axis 3C of the lens 3 and the central axis 2C of the light-emitting device 2 substantially coincide with each other. Further, a solid line indicates a portion of light Ls emitted from the reference light-emitting part 20*s* to the central point AC of the imaging region A. In the example illustrated in FIG. 13, only the reference light-emitting part 20*s* among the plurality of light-emitting parts 20 emits light, and the other light-emitting parts 20 do not emit light. A central axis LC1 is a central axis along the traveling direction of the light emitted from the reference light-emitting part 20*s* to the central point AC of the imaging region A in a state in which the optical axis 3C of the lens 3 and the central axis 2C of the light-emitting device 2 substantially coincide with each other. An irradiation angle θ is an angle formed by the central axis LC1 and the central axis 2C of the light-emitting device 2. A central axis LC2 is a central axis along the traveling direction of the light emitted from the light-emitting device 2 to the central point AC of the imaging region A after the lens 3 is moved.

In the imaging device 100 according to the first embodiment, an irradiation deviation due to a distance between the imaging element 1 and the light-emitting device 2 can be reduced by emitting light with a reference light-emitting part 20*s* as a reference. Even in such a case, there would be a possibility that the center 11*s*C of the reference region 11*s* corresponding to the reference light-emitting part does not coincide with the central point AC of the imaging region A, thereby resulting in an irradiation deviation.

In the present embodiment, the center 11*s*C of the reference region 11*s* and the central point AC of the imaging region A are made to coincide with each other on the irradiation surface 200 by moving the lens 3 based on a positional deviation δ between the center 11*s*C of the reference region 11*s* and the central point AC of the imaging region A. As a result, the deviation between the center 11*s*C of the reference region 11*s* and the central point AC of the imaging region A can be reduced. In the present embodiment, it is possible to provide the imaging device 100*a* that can reduce a deviation of irradiation light L in a captured image by reducing a positional deviation between the center 11*s*C of the reference region 11*s* and the central point AC of the imaging region A. The expression "the center 11*s*C of the reference region 11*s* and the central point AC of the imaging region A coincide with each other" does not require that the center 11*s*C of the reference region 11*s* and the central point AC of the imaging region A perfectly coincide with each other, and may mean that the center 11*s*C of the reference region 11*s* and the central point AC of the imaging region A overlap each other at least partially.

For example, if the center 11*s*C of the reference region 11*s* of the light-emitting device 2 and the central point AC of the imaging region A are made to coincide with each other on the irradiation surface 200 only by moving the lens 3, the lens 3 would be required to move a long distance in some cases. This is particularly noticeable in close-up photography. In the present embodiment, the center 11*s*C of the reference region 11*s* and the central point AC of the imaging region A are made to coincide with each other by both moving the lens 3 and selecting a reference light-emitting part 20*s*. Thus, it is possible to reduce a deviation between the center 11*s*C of the reference region 11*s* and the central point AC of the imaging region A while reducing an increase in the distance by which the lens 3 moves. Accordingly, a deviation of irradiation light in a captured image can be further reduced.

In the example illustrated in FIG. 13, the actuator 8 can move the optical axis 3C of the lens 3 by moving the lens 3 by a movement amount a in the +X direction with respect to the central axis 2C of the light-emitting device 2. By moving the optical axis 3C of the lens 3, irradiation light Ls from the reference light-emitting part 20*s* moves in the +X direction according to the movement amount a. Accordingly, the imaging device 100*a* can irradiate the central point AC of the imaging region A with the irradiation light Ls from the reference light-emitting part 20*s*.

In the example illustrated in FIG. 12 and FIG. 13, the actuator 8 can move the lens 3 along a direction in which the light-emitting device 2 and the imaging element 1 are arranged side by side. Specifically, in the example illustrated in FIG. 12 and FIG. 13, the light-emitting device 2 and the imaging element 1 are arranged in the X direction, and the actuator 8 moves the lens 3 in the X direction. Accordingly, the imaging device 100*a* can easily bring the center of irradiation light L emitted from the plurality of light-emitting parts 20 onto the irradiation surface 200 close to the center of a captured image.

Actuator 8

As the actuator 8, a driver, a stepping motor, a servo motor, a piezoelectric element, a voice coil motor, an ultrasonic motor, or the like can be used. The actuator 8 may include a power transmission member such as a gear, a pulley, or a belt as appropriate.

Functional Configuration of Controller 4

Figure 14:
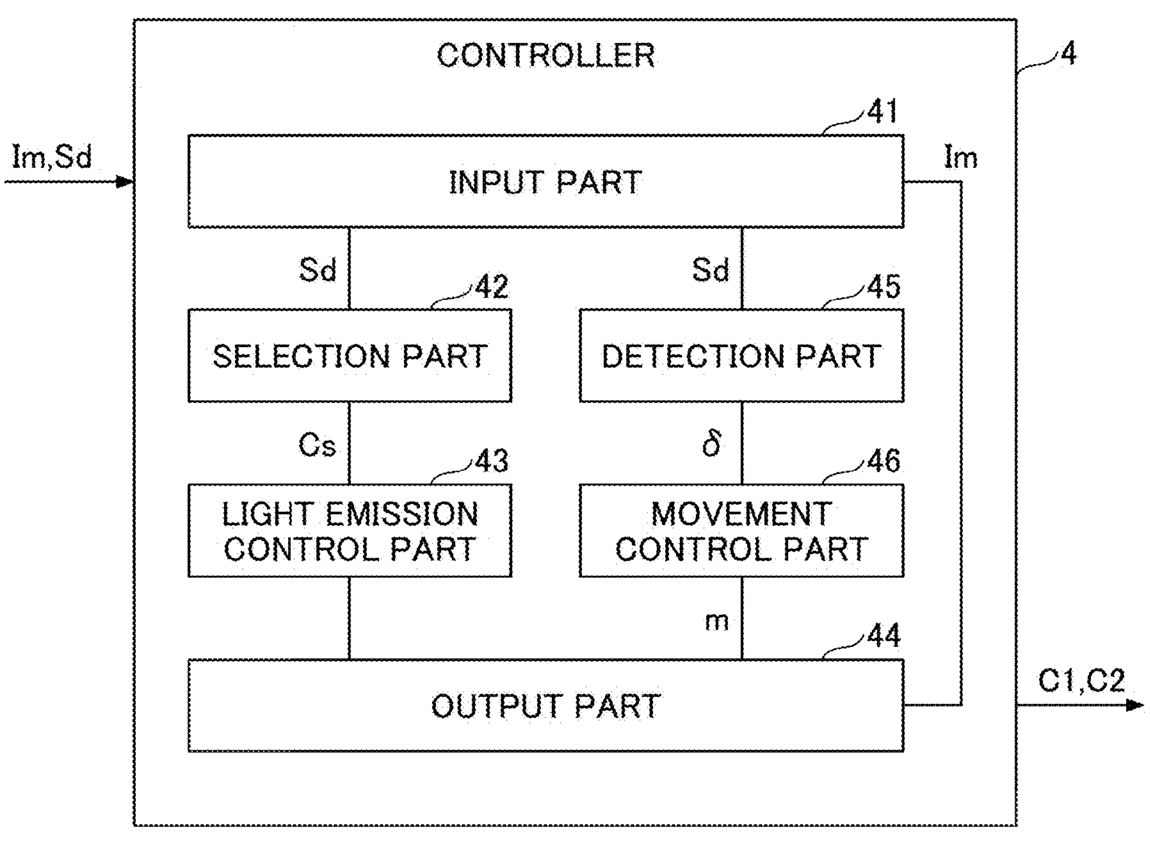
FIG. 14 is a block diagram illustrating a functional configuration of a controller of the imaging device according to the second embodiment.

FIG. 14 is a block diagram illustrating an example of a functional configuration of the controller 4 of the imaging device 100*a*. The controller 4 illustrated in FIG. 14 can use the above-described hardware configuration illustrated in FIG. 9. The controller 4 illustrated in FIG. 14 further includes a detection part 45 and a movement control part 46. Functions of the detection part 45 and the movement control part 46 can be implemented by the CPU 401 executing processing defined in a program stored in the ROM 402.

The detection part 45 obtains an irradiation distance d based on information Sd on a distance to the irradiation surface 200, which is input from the distance detector 7 via the input part 41. The detection part 45 detects a positional deviation δ based on the irradiation distance d. The detection part 45 passes the detected positional deviation δ to the movement control part 46 as information detected by the controller 4.

The movement control part 46 determines the amount of movement of the lens 3 based on the positional deviation δ received from the detection part 45. The movement control part 46 outputs a drive signal C2 to the actuator 8 via the output part 44 in accordance with information m on the amount of movement of the lens 3. Accordingly, the movement control part 46 can move the lens 3 such that the center 11*s*C of the reference region 11*s* and the central point AC of the imaging region A coincide with each other on the irradiation surface 200. The output part 44 outputs the drive signal C2 from the movement control part 46 to the actuator 8 by controlling communication between the actuator 8 and the controller 4.

Operation of Imaging Device 100*a*

Figure 15:
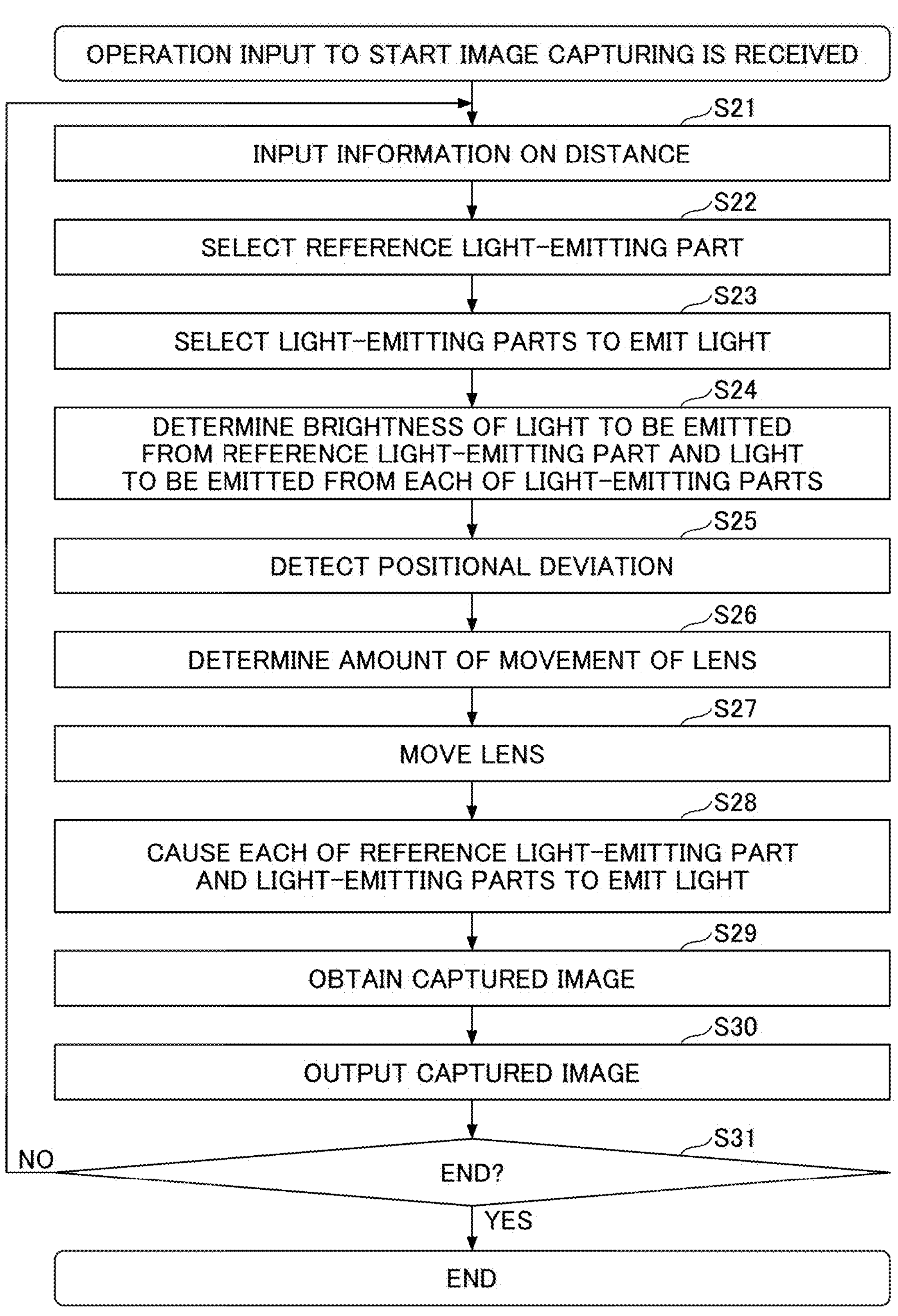
FIG. 15 is a flowchart illustrating the operation of the imaging device according to the second embodiment.

FIG. 15 is a flowchart illustrating an example of the operation of the imaging device 100*a*. For example, the imaging device 100*a* starts a process illustrated in FIG. 15 on the condition that an operation input to start image capturing is received from an operator through an operation part of the imaging device 100*a*. A description of the same steps as those illustrated in FIG. 11 will be omitted, and differences from FIG. 11 will be mainly described.

In step S25, the imaging device 100*a* causes the detection part 45 to obtain an irradiation distance d based on information Sd on a distance from the distance detector 7 to the irradiation surface 200, which is input from the distance detector 7 via the input part 41, and then causes the detection part 45 to detect a positional deviation δ based on the irradiation distance d. The detection part 45 passes the detected positional deviation δ to the movement control part 46.

Subsequently, in step S26, the imaging device 100*a* causes the movement control part 46 to determine the amount of movement of the lens 3 based on the positional deviation δ received from the detection part 45.

Subsequently, in step S27, the imaging device 100*a* causes the movement control part 46 to output a drive signal to the actuator 8 via the output part 44 in accordance with information m on the amount of movement of the lens 3. Steps after step S28 are the same as the steps after step S15 in FIG. 11.

As described above, the imaging device 100*a* can capture an image by using irradiation light L from the light-emitting device 2.

Third Embodiment

Figure 16:
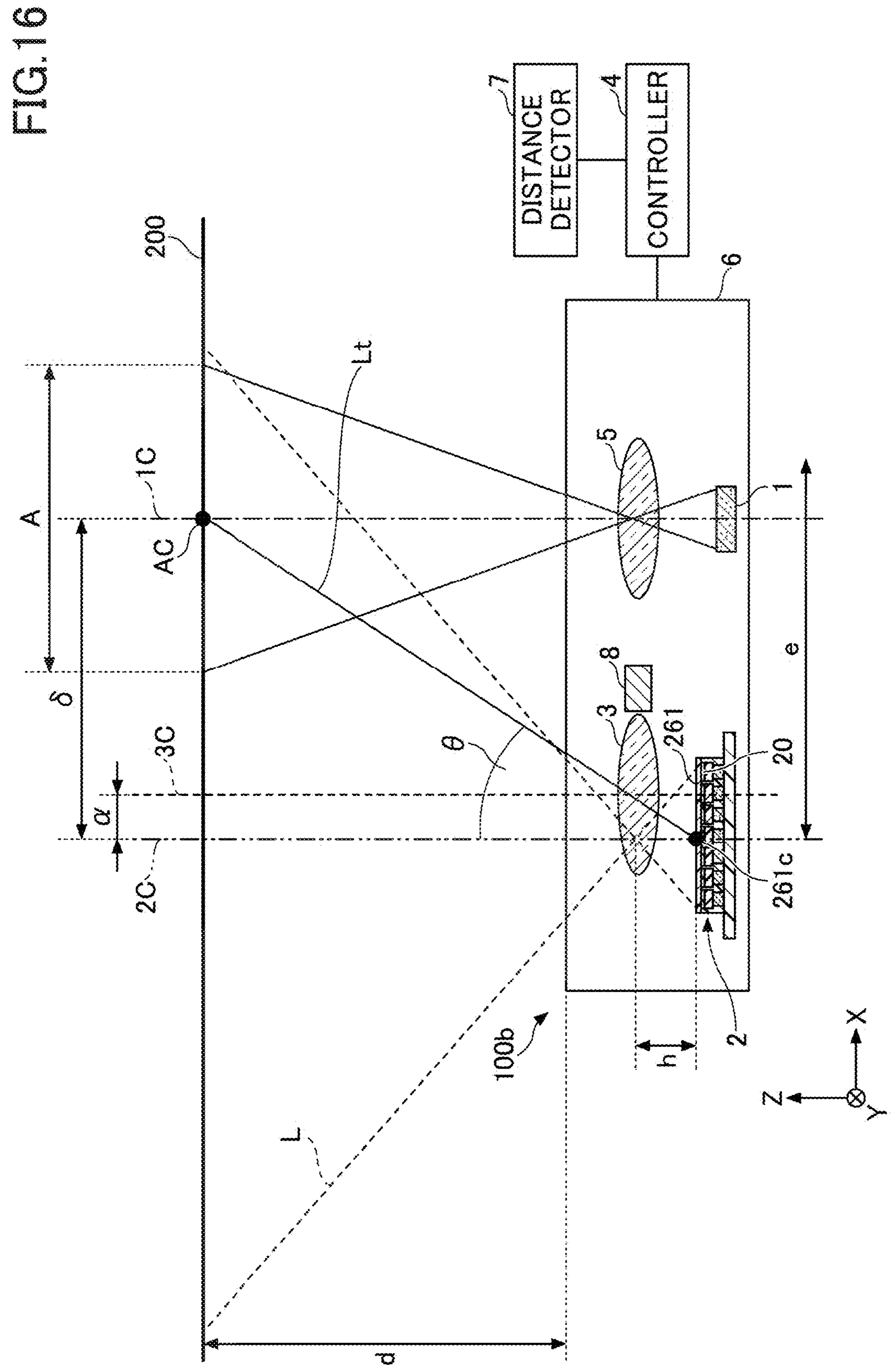
FIG. 16 is a schematic cross-sectional view illustrating an overall configuration of an imaging device according to a third embodiment.

Next, an imaging device according to a third embodiment will be described. FIG. 16 is a schematic cross-sectional view illustrating an example of an overall configuration of an imaging device 100*b* according to the third embodiment. FIG. 16 illustrates a cross section of the imaging device 100*b* including a central axis 1C of an imaging element 1 included in the imaging device 100*b* and a central axis 2C of a light-emitting device 2 included in the imaging device 100*b*. In the example illustrated in FIG. 16, a portion of light emitted from the light-emitting device 2 is indicated by a solid line or a dashed line.

As illustrated in FIG. 16, in the imaging device 100*b*, a controller 4 can detect a positional deviation δ between light Lt emitted from a center 261C of a light-emitting surface 261 of the light-emitting device 2 and a central point AC of an imaging region A on an irradiation surface 200. An actuator 8 moves a lens 3 based on information detected by the controller 4 such that the light Lt emitted from the center 261C of the light-emitting surface 261 of the light-emitting device 2 and the central point AC of the imaging region A coincide with each other on the irradiation surface 200. The present embodiment differs from the first embodiment mainly in the above-described points. From another viewpoint, the present embodiment differs from the first embodiment mainly in that the light Lt emitted from the center 261C of the light-emitting surface 261 of the light-emitting device 2 and the central point AC of the imaging region A coincide with each other by moving the lens 3 without selecting a reference light-emitting part 20*s* from a plurality of light-emitting parts 20 as described in the first embodiment.

In the example illustrated in FIG. 16, a dashed line indicates a portion of irradiation light L obtained when all of a plurality of light-emitting parts 20 included in the light-emitting device 2 emit light in a state in which the optical axis 3C of the lens 3 and the central axis 2C of the light-emitting device 2 substantially coincide with each other. Further, a solid line indicates a portion of light passing along the central axis along the traveling direction of the light Lt emitted from the center 261C of the light-emitting surface 261 of the light-emitting device 2 to the central point AC of the imaging region A. An irradiation angle θ is an angle formed by the central axis of the light Lt and the central axis 2C of the light-emitting device 2.

The controller 4 illustrated in FIG. 16 calculates and obtains an irradiation angle θ of light from the light-emitting device 2 to the central point AC of the imaging region A through the lens 3 based on an interval e between the central axis 1C of the imaging element 1 and the central axis 2C of the light-emitting device 2 and an irradiation distance d from the imaging device 100*b* to the irradiation surface 200. The controller 4 can detect a positional deviation δ between the light Lt emitted from the center 261C of the light-emitting surface 261 of the light-emitting device 2 and the central point AC of the imaging region A based on the obtained irradiation angle θ. The actuator 8 moves the lens 3 based on the positional deviation δ such that the light Lt emitted from the center 261C of the light-emitting surface 261 of the light-emitting device 2 and the central point AC of the imaging region A coincide with each other on the irradiation surface 200. Accordingly, in the present embodiment, the imaging device 100*b* that can reduce a deviation of the irradiation light L in a captured image can be provided.

In the example illustrated in FIG. 16, the light-emitting device 2 can irradiate a region on the irradiation surface 200 that is wider than the imaging region A of the imaging element 1 with light. For example, if the imaging angle of view of the imaging element 1 using an imaging lens 5 is substantially the same as the irradiation angle of view of the light-emitting device 2 using the lens 3, there would be a region that is not irradiated with irradiation light from the light-emitting device 2 in the imaging region A of the imaging element 1. This is particularly noticeable when close-up photography is performed. In the imaging device 100*b*, a region on the irradiation surface 200 that is wider than the imaging region A of the imaging element 1 can be irradiated with light, and thus the light-emitting device 2 can irradiate the entire imaging region A of the imaging element 1 with the irradiation light L even when close-up photography is performed.

In the example illustrated in FIG. 16, the plurality of light-emitting parts 20 are arranged at least along a direction in which the light-emitting device 2 and the imaging element 1 are arranged side by side. Specifically, in the example illustrated in FIG. 16, the light-emitting device 2 and the imaging element 1 are arranged in the X direction, and the plurality of light-emitting parts 20 are arranged in the X direction and the Y direction, that is, at least in the X direction. Accordingly, the imaging device 100*b* can easily bring the center of the light Lt emitted from the light-emitting device 2 onto the irradiation surface 200 close to the center of a captured image.

In the imaging device 100*b*, the controller 4 can cause the plurality of light-emitting parts 20 to emit light with brightness $Br_n$ represented by the above equation (1). By controlling each of the plurality of light-emitting parts 20 to emit light with brightness $Br_n$ represented by the above equation (1), the imaging device 100*b* can reduce, on the irradiation surface 200, irradiation unevenness of irradiation light from each of the plurality of light-emitting parts 20.

In the imaging device 100*b*, the controller 4 can perform control so as to cause, among the plurality of light-emitting parts 20, light-emitting parts 20, corresponding to regions at least partially included in the imaging region A of the imaging element 1, to emit light onto the irradiation surface 200, and cause, among the plurality of light-emitting parts 20, light-emitting parts 20, corresponding to regions not included at all in the imaging region A of the imaging element 1, not to emit light onto the irradiation surface 200. For example, the controller 4 can perform control such that the irradiation region 201 described with reference to FIG. 5 above is irradiated with the light Lt. By causing the controller 4 to perform such control, the imaging device 100*b* can reduce the number of light-emitting parts 20 that are not used for image capturing by the imaging element 1 but emit light, thereby reducing power for driving the light-emitting parts 20. Accordingly, the power consumption of the imaging device 100*b* can be reduced.

Functional Configuration of Controller 4

Figure 17:
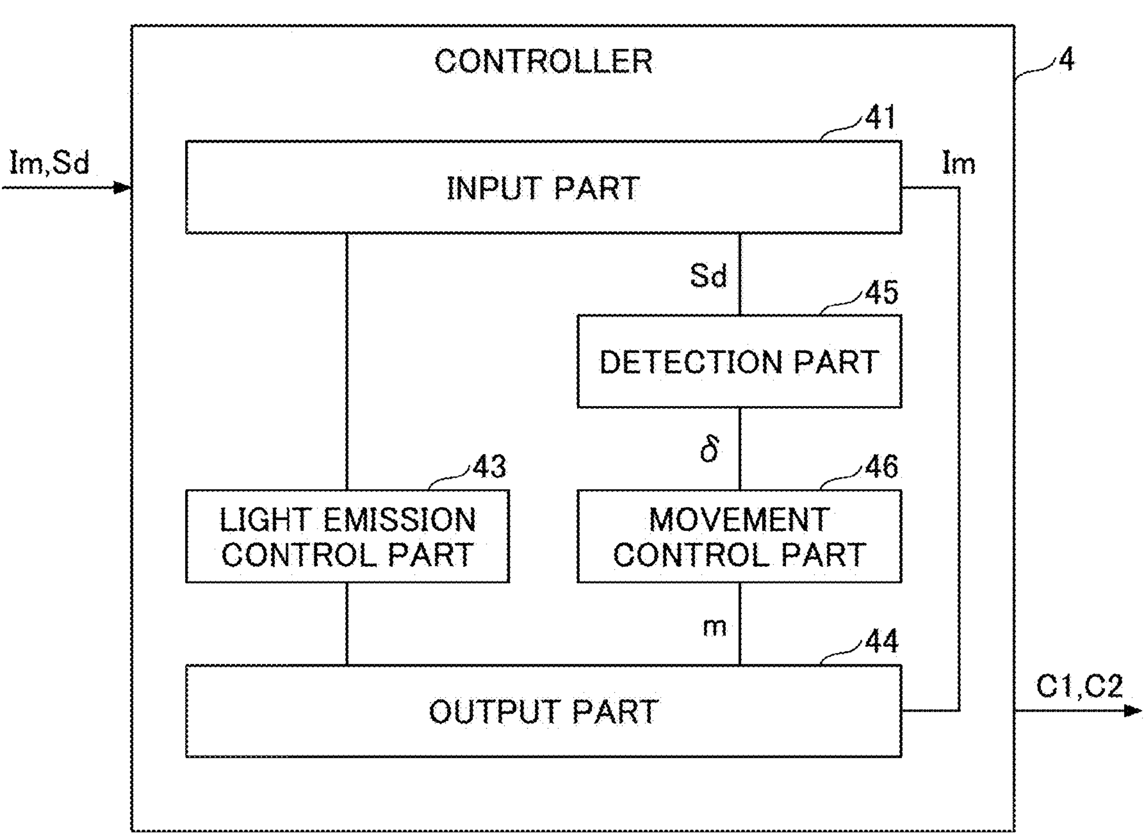
FIG. 17 is a block diagram illustrating a functional configuration of a controller of the imaging device according to the third embodiment.

FIG. 17 is a block diagram illustrating an example of a functional configuration of the controller 4 of the imaging device 100*b*. The controller 4 illustrated in FIG. 17 can use the hardware configuration illustrated in FIG. 9. The controller 4 illustrated in FIG. 17 differs from the controller 4 illustrated in FIG. 14 mainly in that the controller 4 illustrated in FIG. 17 does not include the selection part 42.

Operation of Imaging Device 100*b*

Figure 18:
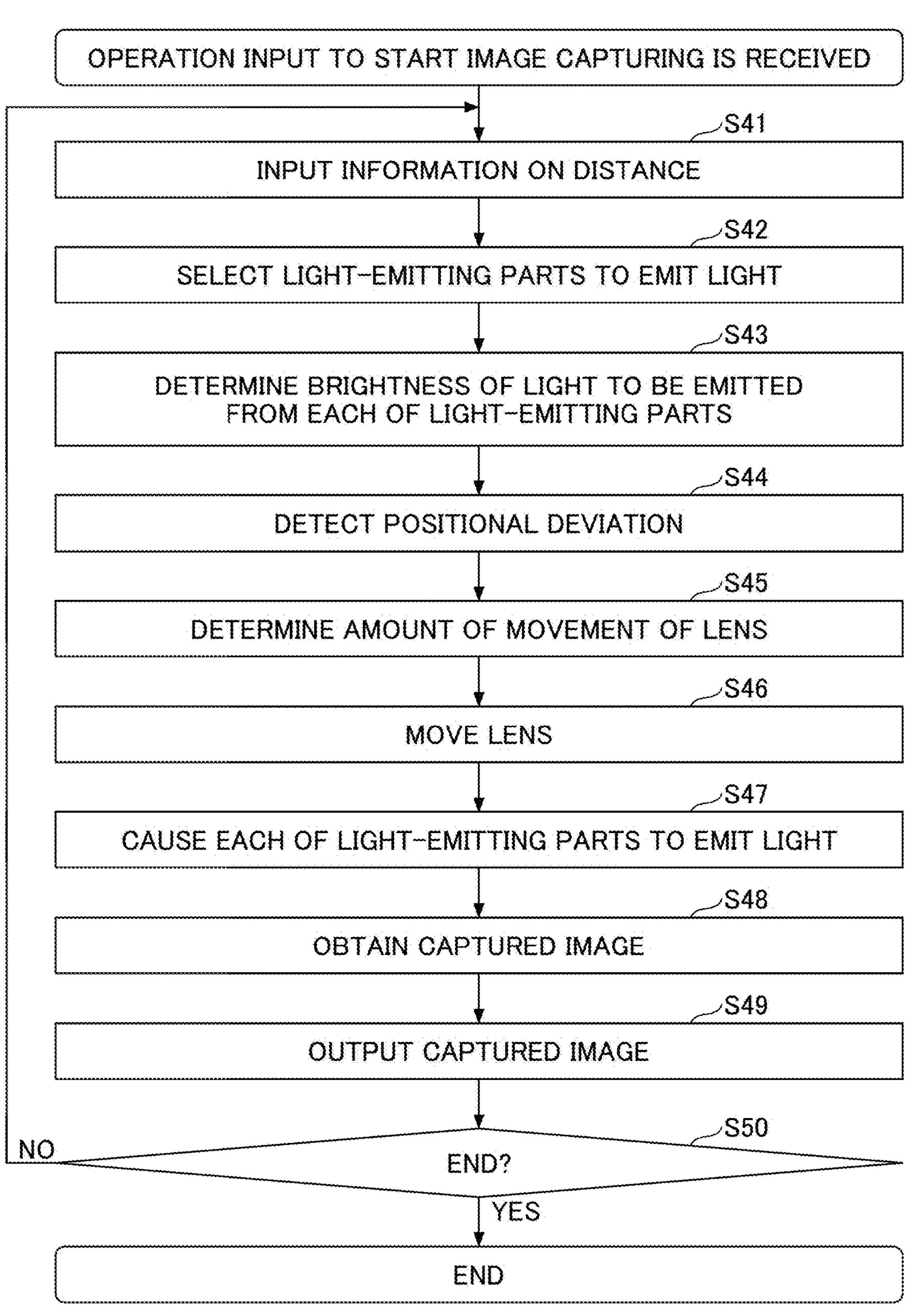
FIG. 18 is a flowchart illustrating the operation of the imaging device according to the third embodiment.

FIG. 18 is a flowchart illustrating an example of the operation of the imaging device 100*b*. The imaging device 100*b* starts a process illustrated in FIG. 18, for example, on the condition that an operation input to start image capturing is received from an operator through an operating part of the imaging device 100*b*. The process illustrated in FIG. 18 differs from the process illustrated in FIG. 15 in that step S22 of FIG. 15 is not performed. By performing the process illustrated in FIG. 18, the imaging device 100*b* can capture an image by using irradiation light L from the light-emitting device 2.

Although embodiments have been described in detail above, the above-described embodiments are non-limiting examples, and various modifications and substitutions can be made to the above-described embodiments without departing from the scope described in the claims.

The numbers such as ordinal numbers and quantities used in the description of the embodiments are all exemplified to specifically describe the technique of the present disclosure, and the present disclosure is not limited to the exemplified numbers. In addition, the connection relationship between the components is illustrated for specifically describing the technique of the present disclosure, and the connection relationship for implementing the functions of the present disclosure is not limited thereto.

The division of the blocks illustrated in each functional block diagram is merely an example. A plurality of blocks can be implemented as a single block, a single block can be divided into a plurality of blocks, or some functions of a block can be transferred to another block. Further, single hardware or software can process the functions of a plurality of blocks having similar functions in parallel or in a time-sharing manner. Further, some or all of the functions can be distributed to a plurality of computers.

The imaging devices according to the present disclosure can reduce a deviation of irradiation light in a captured image, and thus can be suitably used for a camera mounted on a smartphone, a tablet, a PC, a notebook PC, or the like, a digital camera, or the like. In particular, the imaging devices according to the present disclosure are suitable for close-up photography in which the distance to a subject is short and the distance to an irradiation surface is short.

According to an embodiment of the present disclosure, an imaging device that can reduce a deviation of irradiation light in a captured image can be provided.

The invention claimed is:

1. An imaging device comprising:

an imaging element;

a light-emitting device spaced apart from the imaging element in a top view and comprising a plurality of light-emitting parts;

a lens disposed above the light-emitting device; and a controller configured to control light emission of the plurality of light-emitting parts so as to control irradiation light from the light-emitting device onto an irradiation surface that is perpendicular to a central axis of the imaging element and includes a central point of an imaging region, wherein:

the controller is configured to select, as a reference light-emitting part serving as a reference for controlling the irradiation light, a light-emitting part configured to irradiate the central point of the imaging region with light, and the light-emitting device is configured to irradiate the irradiation surface with the irradiation light with the reference light-emitting part as a reference, each of the plurality of light-emitting parts is configured to irradiate a corresponding region on the irradiation surface with light, and the controller is configured to cause a light-emitting part of the plurality of the light-emitting parts to emit light with brightness Brn represented by an equation below:

$$Br_n = Bs \times (1/Dn^2),$$

where Dn (n is an integer of 1 or more) represents a distance from a center of a light-emitting surface of the light-emitting part to a region corresponding to the light-emitting part, and Bs represents brightness preset at a reference distance that is farther than the distance Dn.

2. The imaging device according to claim 1, wherein the light-emitting device is configured to irradiate a region on the irradiation surface that is wider than the imaging region of the imaging element with the irradiation light.

3. The imaging device according to claim 1, wherein the plurality of light-emitting parts are arranged at least along a direction in which the light-emitting device and the imaging element are arranged side by side.

4. The imaging device according to claim 1, wherein:

each of the plurality of light-emitting parts is configured to irradiate a corresponding region on the irradiation surface with light, and the controller is configured to:

cause, among the plurality of light-emitting parts, one or more light-emitting parts, corresponding to regions at least partially included in the imaging region of the imaging element, to emit light, and cause, among the plurality of light-emitting parts, one or more light-emitting parts, corresponding to regions not included at all in the imaging region of the imaging element, not to emit light.

5. The imaging device according to claim 1, further comprising:

an actuator configured to move the lens, wherein:

the controller is configured to detect a positional deviation between a center of a region corresponding to the reference light-emitting part and the central point of the imaging region on the irradiation surface, and the actuator is configured to move the lens, based on information detected by the controller, such that the center of the region corresponding to the reference light-emitting part and the central point of the imaging region coincide with each other on the irradiation surface.

6. The imaging device according to claim 5, wherein the actuator is configured to move the lens along a direction in which the light-emitting device and the imaging element are arranged side by side.

7. An imaging device comprising:

an imaging element;

a light-emitting device spaced apart from the imaging element in a top view and comprising a plurality of light-emitting parts;

a lens disposed above the light-emitting device;

an actuator configured to move the lens; and a controller configured to control light emission of the plurality of light-emitting parts so as to control irradiation light from the light-emitting device onto an irradiation surface that is perpendicular to a central axis of the imaging element and includes a central point of an imaging region, wherein:

the controller is configured to detect a positional deviation between light emitted from a center of a light-emitting surface of the light-emitting device and the central point of the imaging region on the irradiation surface, and the actuator is configured to move the lens, based on information detected by the controller, such that the light emitted from the center of the light-emitting surface of the light-emitting device and the central point of the imaging region coincide with each other on the irradiation surface.

8. The imaging device according to claim 7, wherein the light-emitting device is configured to irradiate a region on the irradiation surface that is wider than the imaging region of the imaging element with the irradiation light.

9. The imaging device according to claim 7, wherein the plurality of light-emitting parts are arranged at least along a direction in which the light-emitting device and the imaging element are arranged side by side.

10. The imaging device according to claim 7, wherein:

each of the plurality of light-emitting parts is configured to irradiate a corresponding region on the irradiation surface with light, and the controller is configured to cause a light-emitting part of the plurality of the light-emitting parts to emit light with brightness $Br_n$ represented by an equation below:

$$Br_n = Bs \times (1/Dn^2),$$

where Dn (n is an integer of 1 or more) represents a distance from a center of a light-emitting surface of the light-emitting part to a region corresponding to the light-emitting part, and Bs represents brightness preset at a reference distance that is farther than the distance Dn.

11. The imaging device according to claim 7, wherein:

each of the plurality of light-emitting parts is configured to irradiate a corresponding region on the irradiation surface with light, and the controller is configured to:

cause, among the plurality of light-emitting parts, one or more light-emitting parts, corresponding to regions at least partially included in the imaging region of the imaging element, to emit light, and cause, among the plurality of light-emitting parts, one or more light-emitting parts, corresponding to regions not included at all in the imaging region of the imaging element, not to emit light.

* * * * *